US009053593B2

(12) United States Patent
Sugimoto et al.

(10) Patent No.: US 9,053,593 B2
(45) Date of Patent: Jun. 9, 2015

(54) VEHICLE DATA ANALYSIS METHOD AND VEHICLE DATA ANALYSIS SYSTEM

(75) Inventors: Hironobu Sugimoto, Chofu (JP); Shojiro Takeuchi, Tokyo (JP); Satomi Yoshioka, Yokohama (JP); Yoshihiro Suda, Tokyo (JP); Yoichi Sato, Tokyo (JP); Takayuki Hirasawa, Tokyo (JP); Daisuke Yamaguchi, Tokyo (JP); Shuguang Li, Tokyo (JP)

(73) Assignees: TOYOTA JIDOSHA KABUSHIKI KAISHA, Toyota-shi (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 14/117,296

(22) PCT Filed: May 15, 2012

(86) PCT No.: PCT/JP2012/003161
§ 371 (c)(1),
(2), (4) Date: Nov. 12, 2013

(87) PCT Pub. No.: WO2012/157255
PCT Pub. Date: Nov. 22, 2012

(65) Prior Publication Data
US 2014/0365029 A1 Dec. 11, 2014

(30) Foreign Application Priority Data

May 16, 2011 (JP) ................................. 2011-109453

(51) Int. Cl.
*G08G 1/01* (2006.01)
*B60W 40/09* (2012.01)
(Continued)

(52) U.S. Cl.
CPC ................. *G07C 5/02* (2013.01); *B60W 40/09* (2013.01); *G08G 1/0112* (2013.01); *B60W 50/045* (2013.01); *B60W 2050/046* (2013.01)

(58) Field of Classification Search
CPC ... B60W 40/09; B60W 50/045; G08G 1/0112
See application file for complete search history.

(56) References Cited

U.S. PATENT DOCUMENTS

2002/0128751 A1   9/2002   Engstrom et al.
2005/0159851 A1   7/2005   Engstrom et al.
(Continued)

FOREIGN PATENT DOCUMENTS

JP   2006 350567   12/2006
JP   2008-140118    6/2008
(Continued)

OTHER PUBLICATIONS

Merat, N. et al., "The comparative merits of expert observation, subjective and objective data in determining the effects on in-vehicle information systems on driving performance", Safety Science, vol. 49, No. 2, pp. 172-177, XP027459456, (Feb. 1, 2011).

(Continued)

*Primary Examiner* — Michael J Zanelli
(74) *Attorney, Agent, or Firm* — Oblon, McClelland, Maier & Neustadt, L.L.P.

(57) ABSTRACT

The invention provides a vehicle data analysis method that enables quantitative analysis of characteristics of vehicle data indicating transition in a driver's driving operation, and a vehicle data analysis system using this analysis method. A plurality of vehicle data are collected based a plurality of types of driving operations. Based on an evaluation criterion as an index for evaluating levels of the driving operations, the collected vehicle data are grouped into at least two groups. Characteristic values of the vehicle data differing between these groups are extracted.

14 Claims, 11 Drawing Sheets

(51) Int. Cl.
*G07C 5/02* (2006.01)
*B60W 50/04* (2006.01)

(56) References Cited

U.S. PATENT DOCUMENTS

| | | |
|---|---|---|
| 2009/0150314 A1 | 6/2009 | Engstrom et al. |
| 2010/0211270 A1* | 8/2010 | Chin et al. .................... 701/44 |
| 2011/0145042 A1* | 6/2011 | Green et al. ................. 705/14.1 |
| 2011/0166773 A1* | 7/2011 | Raz et al. ..................... 701/123 |
| 2011/0251752 A1* | 10/2011 | Delarocheliere et al. ....... 701/33 |
| 2011/0257832 A1 | 10/2011 | Ishida et al. |
| 2012/0089423 A1* | 4/2012 | Tamir et al. ...................... 705/4 |
| 2012/0185162 A1 | 7/2012 | Ishido |
| 2014/0039749 A1* | 2/2014 | Jelbert et al. ................ 701/32.1 |

FOREIGN PATENT DOCUMENTS

| | | |
|---|---|---|
| JP | 2009-31046 | 2/2009 |
| JP | 2009 098970 | 5/2009 |
| JP | 2009 294250 | 12/2009 |
| JP | 2010-144684 | 7/2010 |
| JP | 2012 113631 | 6/2012 |
| WO | WO 2009/104256 A1 | 8/2009 |
| WO | WO 2010/023802 A1 | 3/2010 |

OTHER PUBLICATIONS

International Search Report Issued Aug. 3, 2012 in PCT/JP12/003161 Filed May 15, 2012.

U.S. Appl. No. 13/988,897, filed Jul. 23, 2013, Takeuchi et al.

* cited by examiner

Fig. 8(a)

| Evaluation Item | Travel Area | Degree Of Influence | Characteristic Value | Traffic Element | Travel Point |
|---|---|---|---|---|---|
| Fuel Economy | Travel Area Ar1 | 1 | Steering Angle A1 | Curve Cv2 | Pa3 (XXX Meters From Start Of Curve Cv2) |
| | | 2 | Steering Angle B3 | Travel Section Sec2 | Pa2 (XXX Meters From Start Of Section Sec2) |
| | | 3 | Accelerator B3 | Travel Section Sec1 + Curve Cv1 | Pa1 (XXX Meters From Start Of Section Sec1) |
| | | 4 | Brake A1 | Curve Cv2 | ... |
| | | 5 | Steering Angle B1 | Curve Cv1 | ... |
| | | 6 | Steering Angle B2 | ... | ... |
| | | 7 | ... | ... | ... |
| | | n | ... | ... | ... |
| | Travel Area Ar2 | 1 | Accelerator A1 | Curve Cvn | Pb55 (XXX Meters From Start Of Curve Cn) |
| | | 2 | Accelerator B3 | Crossroads | Pb2 (XXX Meters From Start Of Crossroads) |
| | | 3 | Brake A1 | Crossroads | Pb3 (XXX Meters From The Start Of Crossroads) |
| | | 4 | Accelerator B2 | Downgrade | Pb10 (XXX Meters From Start Of Downgrade) |
| | | 5 | Steering Angle A1 | Travel Section Secn | Pbc7 (XXX Meters From Start Of Section) |
| | | 6 | ... | ... | ... |
| | | . | ... | ... | ... |
| | | n | ... | ... | ... |
| | Travel Area Arn | 1 | ... | ... | ... |
| | | . | ... | ... | ... |
| | | n | ... | ... | ... |

Fig. 10(a)

| Evaluation Item | Degree Of Influence | Characteristic Value | Traffic Element | Travel Point |
|---|---|---|---|---|
| Fuel Economy | 1 | Steering Angle A1 | Curve | Pa3 (XXX Meters From Start Of Curve) |
| | 2 | Steering Angle B3 | | Pa2 (XXX Meters From Start Of Curve) |
| | . | ... | | ... |
| | 1 | Accelerator B3 | Crossroads | Pb2 (XXX Meters From Start Of Crossroads) |
| | . | ... | | ... |
| | 1 | ... | Railroad Crossing | Pc1 (XXX Meters From Start Of Railroad Crossing) |
| | . | ... | | ... |
| | 1 | ... | Travel Section sec1 | Pdc7 (XXX Meters From Start Of Section) |
| | . | ... | ... | ... |
| | 1 | ... | Travel Section secn | ... |
| | . | ... | | ... |
| Jerk | 1 | Steering Angle A1 | Curve | Pa4 (XXX Meters From Start Of Curve) |
| | 2 | Steering Angle A2 | | Pa7 (XXX Meters From Start Of Curve) |
| | 3 | Steering Angle B3 | | Pa10 (XXX Meters From Start Of Curve) |
| | 4 | Brake A1 | | ... |
| | . | ... | | ... |
| | 1 | Accelerator A1 | Crossroads | Pb2 (XXX Meters From The Start Of Crossroads) |
| | . | Brake A1 | | ... |
| | 1 | ... | Travel Section sec1 | Pc5 (XXX Meters From Start Of Section) |
| | . | ... | ... | ... |
| | 1 | ... | Travel Section secn | Pb8 (XXX Meters From Start Of Section) |
| | . | ... | | ... |

Fig. 10(b)

| | | | | |
|---|---|---|---|---|
| Vehicle Behavior | 1 | Steering Angle A1 | Curve | Pa9 (XXX Meters From Start Of Curve) |
| | 2 | Steering Angle A4 | Curve | ... |
| | · | ... | | ... |
| | 1 | Steering Angle A1 | Crossroads | Pb3 (XXX Meters From The Start Of Crossroads) |
| | · | Brake B5 | ... | ... |
| | 1 | ... | Travel Section sec1 | Pc1 (XXX Meters From Start Of Section) |
| | · | ... | ... | ... |
| | · | ... | ... | ... |
| | 1 | ... | Travel Section secn | ... |
| | 1 | Accelerator B1 | Curve | ... |
| | 2 | Brake B2 | Curve | ... |
| | · | ... | ... | ... |
| | 1 | Accelerator B5 | Crossroads | ... |
| | · | Brake A1 | ... | ... |
| Travel Time | 1 | ... | Travel Section sec1 | ... |
| | · | ... | ... | ... |
| | 1 | ... | Travel Section secn | ... |
| | · | ... | ... | ... |

VEHICLE DATA ANALYSIS METHOD AND VEHICLE DATA ANALYSIS SYSTEM

TECHNICAL FIELD

The present invention relates to a vehicle data analysis method advantageously applicable to analysis of vehicle data obtained from a vehicle, and to a vehicle data analysis system using this vehicle data analysis method.

BACKGROUND ART

A drive assist system for assisting a driver to drive a vehicle is typically designed to acquire traffic information relating to crossroads, momentary stop positions, curves, a vehicle approaching from ahead, and other information requiring the driver to decelerate the vehicle, by means of a vehicle-mounted camera, a navigation system, or the like. The drive assist system then provides drive assist to the driver based on the traffic information around the vehicle thus acquired, for example by giving the driver a voice guidance message to decelerate.

This type of drive assist is generally performed, using a standard travel pattern obtained by averaging data of various driving behaviors including perception of traffic information, judgment, and driving operation of ordinary drivers, which are measured under a predetermined travel model such as a mock driving course. PTL 1, for example, describes a system that firstly generates exemplary operation data indicating time-series transition of exemplary operation amount of operating equipment such as an accelerator pedal or a brake pedal based on information relating to an approach speed for a crossroads or a curve, and the shape of a road such as curvature radius of a crossroads or a curve (travel model). The system then registers the generated exemplary operation data in a database as an exemplary driving model (standard travel pattern). The system presents, to a driver of a vehicle to be assisted, the exemplary operation data registered in the database simultaneously with data on transition in operation amount of various operating equipment by the driver, so that the driving behavior of the driver is evaluated.

A travel pattern of a vehicle approaching a crossroads or a momentary stop position generally varies according to road environment having a variety of elements such as curvature of a road curve, width and inclination of a road, as well as according to the driver's driving habit or driving technique. It is difficult to adapt standardized travel patterns to such a varying travel pattern of a driver. This means that it is not realistic to generate an exemplary driving model based on the actual road environment, driver's driving habit and driving technique, since it takes a huge amount of man-hours to generate such a model.

On the other hand, another method has recently been studied, wherein a vehicle data group collected during driving operation by a plurality of drivers is stratified according to their driving techniques, that is, their driving performance levels, by analyzing vehicle data indicating transition of driving operation by the drivers. However, even with such a method of stratifying the vehicle data group according to drivers' driving performance levels, it is still difficult to identify what kind of a driving operation causes a difference in driving performance level among the drivers. Therefore, it has not been successful to identify the factors for which different drivers have different driving performance levels. In other words, it has not been successful to identify the driving elements to be assisted in order to improve the driving performance level. This means that characteristics of vehicle data collected based on drivers' driving operations cannot be quantitatively understood.

CITATION LIST

Patent Literature

PTL 1: Japanese Laid-Open Patent Publication No. 2009-294250

SUMMARY OF INVENTION

The present invention has been made in view of the circumstances as described above. It is an objective of the invention to provide a vehicle data analysis method advantageously applicable to analysis of vehicle data obtained from vehicles, and a vehicle data analysis system using this vehicle data analysis method.

Means for achieving the objective and advantages thereof will be described below.

In accordance with one aspect of the present disclosure, a vehicle data analysis method for analyzing vehicle data reflecting a driver's driving operation is provided. The method includes: collecting a plurality of pieces of vehicle data based on a plurality of types of driving operations; grouping these collected pieces of the vehicle data into at least two groups based on an evaluation criterion that is an index for evaluating a level of the driving operation; and extracting characteristic values of vehicle data differing between the groups.

In accordance with another aspect of the present disclosure, a vehicle data analysis system for analyzing vehicle data reflecting a driver's driving operation is provided. The system includes a storage device for storing vehicle data based on a plurality of types of driving operations, a vehicle data classification unit for grouping the vehicle data stored in the storage device into at least two groups based on an evaluation criterion that is an index for evaluating a level of driving operation, and a vehicle data analysis unit (250) for extracting characteristic values of vehicle data differing between the groups grouped by the vehicle data classification unit.

Vehicle data indicating a driver's driving operation indicates an operating mode for various driving elements such as an accelerator, a brake pedal, and a steering wheel. The operating mode for such driving elements significantly affects the fuel efficiency and vehicle behavior during operation of the vehicle. For example, a vehicle data group that is evaluated to be of a high driving performance level for the reason that it has a low fuel consumption per unit time, that is, a high fuel efficiency (fuel conservation), often includes a common characteristic value such as accelerator-off at a predetermined timing. On the other hand, a vehicle data group that is evaluated to be of a low driving performance level for the reason that it has high fuel consumption, often includes a characteristic value such as an accelerator-off at a relatively delayed timing or excessive depression of the accelerator pedal. When the characteristic values contained in the vehicle data groups that are mutually different in driving performance level are different from each other, the driving operation indicated by these different characteristic values often constitutes a factor causing a difference in driving performance level of the vehicle data. This means that these different characteristic values, in other words, performance of a certain driving operation indicated by these characteristic values causes a difference in fuel efficiency as a result of the driving operation or vehicle behavior during traveling of the vehicle.

According to the aforementioned method or configuration, vehicle data indicating transition in the driving elements such as accelerator operation amount or steering angle of the steering wheel are collected from vehicles. The collected vehicle data are grouped according to an evaluation criterion capable of identifying a driver's driving technique, whereby the vehicle data group acquired under a plurality of types of driving operations is categorized according to driving performance levels. Characteristic values differing between these groups categorized according to driving performance levels are extracted, whereby a characteristic value constituting a factor causing a difference in driving performance level between the categorized vehicle data is extracted. This makes it possible to extract information quantitatively indicating the factor causing the difference in driving performance level between the vehicle data from the vehicle data group acquired based on a plurality of types of driving operations. In other words, the characteristic of the driving operation contained in the vehicle data can be analyzed quantitatively.

The collected vehicle data are acquired from vehicles that have traveled on an actual road under a plurality of types of driving operations by a driver. Therefore, the use of the vehicle data also makes it possible to generate a travel model reflecting an actual travel environment or driving operations performed under the travel environment. In this case, a travel model incorporating characteristic values determining a driving performance level can be generated by generating an exemplary travel model from the extracted characteristic values of the vehicle data.

The vehicle data analysis method of the present disclosure preferably obtains a degree of influence exerted by the extracted characteristic value of vehicle data on the vehicle data evaluated based on the evaluation criterion.

In the vehicle data analysis system of the present disclosure, the vehicle data analysis unit preferably further includes an influence calculation unit for obtaining a degree of influence exerted by the extracted characteristic value on the vehicle data evaluated based on the evaluation criterion.

The characteristic values contained in the vehicle data include characteristic values exerting a high influence on an evaluation result of the vehicle data based on an evaluation criterion and characteristic values exerting a low influence on the evaluation result. The characteristic values exerting a high influence on the evaluation result constitute a principal factor causing a difference in driving performance level in the vehicle data group.

Therefore, the method or configuration described above determines an influence exerted by the extracted characteristic value of vehicle data on the vehicle data evaluated under the evaluation criterion. This makes it possible to specify not only the characteristic values differing between the grouped vehicle data but also a degree of influence exerted by the characteristic value on the vehicle data evaluated under the evaluation criterion, in other words, on the evaluation using the evaluation criterion.

Preferably, in the vehicle data analysis method of the present disclosure, the vehicle data includes information indicating one of a traffic element, a travel section, and a travel area where the traffic element and travel sections are connected in series, and the grouping of the vehicle data and the extraction of the characteristic values of the vehicle data are performed by treating the traffic element or the travel section or the travel area as a unit.

Preferably, in the vehicle data analysis system of the present disclosure, the vehicle data includes information indicating a traffic element, a travel section, and a travel area where the traffic element and travel section are connected in series. The vehicle data classification unit and the vehicle data analysis unit perform grouping of the vehicle data and extraction of the characteristic values of the vehicle data by treating the traffic element or the travel section or the travel area as a unit.

A driver's driving operation significantly reflects traffic elements such as crossroads with a traffic light or curves, predetermined travel sections defined by traffic elements such as crossroads or curves, and a travel environment surrounding the vehicle such as a travel area including traffic elements and travel sections. Characteristics of driving operations performed under such travel environment usually vary depending on the travel environment under which the vehicle travels. A driver's driving technique also varies depending on different travel environments. For example, a driver may exhibit high driving technique around a curve because the behavior of the vehicle at the curve is small, but may exhibit low driving technique at a deceleration or stopping position such as a crossroads since the fuel consumption is high at the deceleration or stopping position. Accordingly, even if data for a single vehicle is acquired based on the same driver's driving operations, its evaluation results under an evaluation criterion often differ depending on the travel environment of the vehicle.

When vehicle data is categorized into groups and characteristic values of the vehicle data are extracted by treating traffic elements or travel sections or travel areas constituting a travel environment as units according to the method or configuration described above, the characteristic values of the vehicle data reflecting a series of driving operations relating to the traffic elements, the travel sections, and travel areas can be extracted accurately from the vehicle data groups. This makes it possible to identify a factor causing a difference in driving performance level by treating traffic elements, travel sections, and travel areas as units. This also makes it possible to extract more characteristic values from the collected vehicle data.

Preferably, in the vehicle data analysis method of the present disclosure, the vehicle data includes information indicating a travel point, and the vehicle data analysis method further comprises obtaining a correspondence relationship between the extracted characteristic values of the vehicle data and the travel point, and a correspondence relationship between the extracted characteristic values of the vehicle data and an evaluation result of the vehicle data based on the evaluation criterion. The correspondence relationship between the characteristic value and the travel point indicates how the weighted characteristic value of the vehicle data relates to the travel point where the driving operation indicated by the characteristic value is performed. The correspondence relationship between the characteristic value and the evaluation criterion indicates how the weighted characteristic value of the vehicle data relates to the travel point where the driving operation indicated by the characteristic value is performed.

Preferably, in the vehicle data analysis system of the present disclosure, the vehicle data includes information indicating a travel point. The vehicle data analysis unit further obtains a correspondence relationship between the extracted characteristic values of the vehicle data and the travel point, and a correspondence relationship between the extracted characteristic values of the vehicle data and an evaluation result of the vehicle data based on the evaluation criterion.

For example, after a vehicle enters a curve, various driving operations are performed at travel points forming the curve according to a road shape or the like before exiting the curve. This means that even if vehicle data indicate driving operations at a common curve or curves similar in curvature radius or the like, the vehicle data reflecting driving operations at different travel points contain separate characteristic values corresponding to the respective travel points. Therefore, even if the vehicle data have been acquired based on the same driver's driving operations, evaluation results of the vehicle data at different travel points may differ among the travel points. For example, high fuel efficiency (fuel saving) will be exhibited from a starting point of a curve to an intermediate point of the curve, whereas a low fuel efficiency will be exhibited from the intermediate point of the curve to the terminal point of the curve.

Therefore, in the method or configuration as described above, a correspondence relationship between characteristic values for vehicle data and travel points and a correspondence relationship between characteristic values of vehicle data and an evaluation criterion are obtained, whereby a characteristic value observed at each of the travel points and an influence exerted by the characteristic value on the evaluation criterion can be obtained for each of the travel points. This makes it possible to analyze the vehicle data in a more detailed manner, and to analyze for factors causing a difference in driving performance level based on the evaluation criterion and an influence exerted by the factor on the evaluation criterion minutely to the level of travel points.

Preferably, the vehicle data analysis method of the present disclosure further includes normalizing time-series data as the vehicle data based on a travel position.

Preferably, in the vehicle data analysis system of the present disclosure, the vehicle data analysis unit further includes a normalization operation unit for normalizing time-series data as the vehicle data based on a travel position.

In general, travel speed of a vehicle serving as a supply source for vehicle data varies depending on different vehicles and different drivers. Therefore, a comparison is performed between time-series data, more specifically vehicle data in which a driver's driving operation modes acquired in common or similar travel environments are recorded in time series. However, if the travel speeds of the vehicle as the supply source of the data differ significantly, the time-series data of driving operations at a certain travel position are possibly compared with time-series data of driving operations at a different travel position.

However, according to the method or configuration described above, the time-series data are normalized based on a travel position, so that the time-series data acquired from vehicles with different travel speeds can be transformed to a level enabling accurate comparison. This makes it possible to analyze more vehicle data (time-series data), and to extract more characteristic values differing between such vehicle data.

Preferably, in the vehicle data analysis method of the present disclosure, the characteristic values indicate characteristics of one or more driving elements representing a driver's driving operation mode, and the analysis method further comprises obtaining a degree of influence exerted by the driving element on the evaluation criterion for each of the driving elements.

Preferably, in the vehicle data analysis system of the present disclosure, the characteristic values are characteristics of one or more driving elements indicating a driver's driving operation mode, and the vehicle data analysis unit determines a degree of influence exerted by the driving element on the evaluation criterion for each of the driving elements.

In general, fuel efficiency or vehicle behavior, which indicates a driver's driving results, varies depending on a plurality of types of operating modes of driving elements such as steering angle and accelerator operation amount. The driving performance levels differ between the vehicle data due to a difference in operating modes of the driving elements.

Therefore, according to the method or configuration described above, an influence exerted by a driving element indicated by the characteristic value on the evaluation criterion is determined for each of the driving elements, so that a plurality of factors causing a difference in driving performance level of vehicle data can be accurately identified even when a difference occurs in driving performance level due to influences from a plurality of types of driving elements. This makes it possible to accurately extract characteristic values locally contained in the vehicle data, and to specify a degree of influence exerted by each of the driving elements on the evaluation criterion.

Preferably, the vehicle data analysis method of the present disclosure further includes generating a plurality of candidate data as original data for indicating the characteristic values of the vehicle data by way of frequency resolution of the vehicle data.

Preferably, the vehicle data analysis unit further has a frequency resolution unit for generating a plurality of candidate data as original data for indicating characteristic values of vehicle data by way of frequency resolution of the vehicle data.

The characteristic values of vehicle data are often contained as various frequency components in the vehicle data, and the driving performance levels of the vehicle data are made different from each other by the influence of characteristic values contained in the frequency components.

The method or configuration described above is able to reveal various characteristic values reflecting driving operations by extracting various frequency components contained in the vehicle data by way of frequency resolution of the vehicle data. Therefore, when characteristic values that are different between the grouped vehicle data are to be extracted, a large amount candidate data containing candidate characteristic values can be generated from a limited amount of vehicle data.

Preferably, the vehicle data analysis method of the present disclosure further includes revealing the characteristic values by applying a window function to the vehicle data prior to the extraction of the characteristic values of vehicle data.

Preferably, in the vehicle data analysis system disclosed herein, the vehicle data analysis unit further includes a window function operation unit for revealing a characteristic value by applying a window function to the vehicle data.

According to the method or configuration described above, a characteristic value of vehicle data is revealed by applying a window function to the vehicle data, whereby a minute characteristic value also can be extracted accurately.

Preferably, in the vehicle data analysis method of the present disclosure, the evaluation criterion is a criterion for grouping that is performed for at least one of evaluation items consisting of fuel efficiency defined by travel distance of a vehicle per unit fuel amount, travel time, vehicle behavior, and lateral jerk of a vehicle.

Preferably, in the vehicle data analysis system disclosed herein, the vehicle data classification unit categorizes the vehicle data into groups based on evaluation criteria relating to at least one of evaluation items consisting of fuel efficiency indicated by a travel distance of the vehicle per unit fuel amount, travel time, vehicle behavior, and lateral jerk of the vehicle.

In general, a driving operation capable of realizing low fuel consumption and smooth driving operation with small vehicle behavior can be evaluated that the driver's driving technique is high, and the vehicle data can be categorized into groups according to driving performance levels for evaluation items including the fuel efficiency and the vehicle behavior, as well as travel time and lateral jerk of the vehicle. Therefore, according to the method or configuration described above, a factor causing a difference in fuel efficiency, travel time, smooth driving operation (presence or absence of rapid braking), and lateral jerk between the collected vehicle data can be identified by extracting the characteristic values of vehicle data categorized using indices of the evaluation items.

Preferably, in the vehicle data analysis method of the present disclosure, the grouping includes categorizing the plurality of types of vehicle data into a vehicle data group of "high" driving performance level and a vehicle data group of "low" driving performance level by way of the grouping based on the evaluation criterion. The extraction of the vehicle data includes performing weighting on characteristic values of vehicle data differing in the driving performance level based on a total value of differences of characteristic values which are common between the data group of "high" driving performance level and the vehicle data group of "low" driving performance level, which are grouped based on the evaluation criterion. The difference of the common characteristic values is a difference between the characteristic value of the data categorized by the group of "high" driving performance level and the characteristic value of the data categorized by the group of "low" driving performance level.

Preferably, in the vehicle data analysis system disclosed herein, the vehicle data classification unit categorizes the plurality of types of vehicle data into a vehicle data group of "high" driving performance level and a vehicle data group of "low" driving performance level by means of grouping based on the evaluation criterion, and the vehicle data analysis unit extracts the vehicle data by weighting characteristic values of the vehicle data having different driving performance levels based on a total value of common differences of the data categorized into the vehicle data group of "high" driving performance level and the vehicle data group of "low" driving performance level based on the evaluation criterion. The common difference of the characteristic values is a difference between a characteristic value of data categorized as of "high" driving performance level and a characteristic value of data categorized as of "low" driving performance level under the common evaluation criterion.

In the vehicle data group described above, a characteristic value that exhibits a greater difference between vehicle data indicating an operation amount of steering angle at a certain timing of the data categorized as of "high" driving performance level and vehicle data corresponding to the operation amount of steering angle of the data categorized as of "low" driving performance level can be a principal factor causing a difference in driving performance level. A characteristic value that exhibits a high rate of occurrence of difference between the vehicle data of "high" driving performance level and the vehicle data of "low" driving performance level can be a principal factor causing a difference in driving performance level. On the other hand, when a characteristic value of vehicle data indicating a depression amount of accelerator pedal at a certain timing is similar between data categorized as of "high" driving performance level and data categorized as of "low" driving performance level, the characteristic value cannot be a factor causing a difference in driving performance level of the vehicle data group.

Therefore, according to the method or configuration described above, characteristic values of vehicle data differing in driving performance level are weighted according to a total value of difference of the characteristic values, so that factors causing differences in driving performance level can be identified in the order of degree of influence to the evaluation criterion. This makes it possible to identify elements to be improved in the driving operation indicated by the vehicle data evaluated as "low" in driving performance level, in the order of priority.

The features of the present invention that are believed to be novel are set forth with particularity in the appended claims. The invention, together with objects and advantages thereof, may best be understood by reference to the following description of the presently preferred embodiments together with the accompanying drawings in which:

BRIEF DESCRIPTION OF DRAWINGS

FIG. 8(a) is a diagram showing an example of an analysis result of a vehicle data group;

FIG. 10(a) is a diagram showing an example of an analysis result of a vehicle data group according to another embodiment of a vehicle data analysis method and vehicle data analysis system of the invention.

FIG. 10(b) is a diagram showing an example of an analysis result of a vehicle data group according to another embodiment of a vehicle data analysis method and vehicle data analysis system of the invention.

DESCRIPTION OF EMBODIMENTS

A vehicle data analysis method and vehicle data analysis system according to one embodiment of the present invention will be described with reference to FIGS. 1 to 9.

Figure 1:
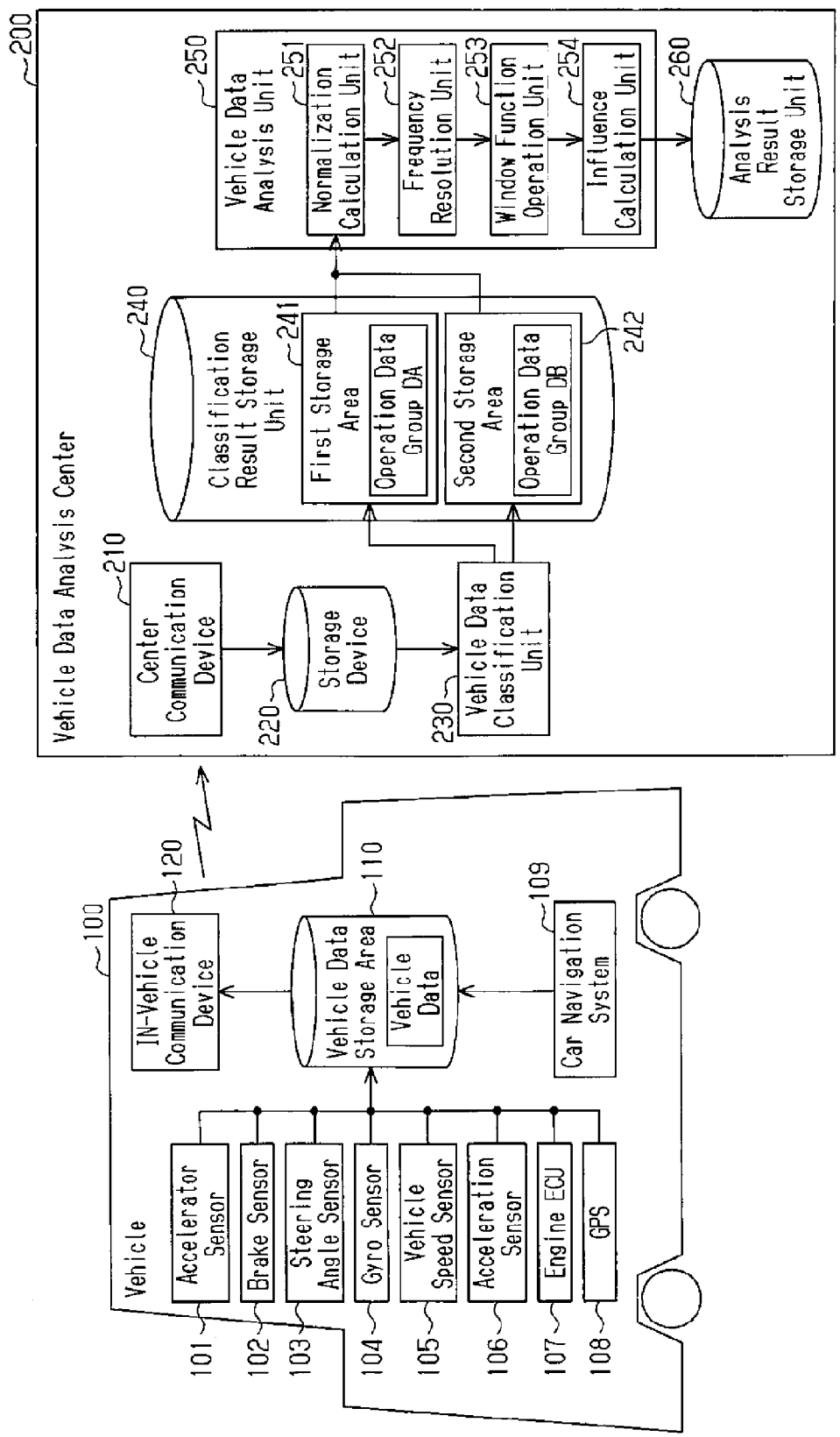
FIG. 1 is a block diagram of a vehicle data analysis system to which a vehicle data analysis method of the invention is applied, according to one embodiment of a vehicle data analysis method and system of the invention.

As shown in FIG. 1, a vehicle data analysis system to which a vehicle data analysis method of the present embodiment is applied has a vehicle data analysis center 200 for collecting vehicle data reflecting driving operations of a driver of a vehicle 100.

The vehicle 100 serving as a supply source (acquisition source) of vehicle data is configured to enable detection of operating modes of various driving elements by a driver, and has an accelerator sensor 101, a brake sensor 102, steering angle sensor 103, a gyro sensor 104, a vehicle speed sensor 105, and an acceleration sensor 106. These sensors 101 to 106 are connected to a vehicle data storage area 110 via an in-vehicle network such as can (Control Area Network). The vehicle data storage area 110 stores detection results of the sensors 101 to 106 in time series as the vehicle data reflecting driving operations of a driver of the vehicle 100.

The accelerator sensor 101 detects an accelerator operation amount, which varies according to the driver's operation of the accelerator pedal, and outputs a signal corresponding to the detected accelerator operation amount to the vehicle data storage area 110. The brake sensor 102 detects a depression amount of a brake pedal operated by the driver, and outputs a signal corresponding to the detected depression amount to the vehicle data storage area 110. The steering angle sensor 103 detects a steering angle, which varies according to the driver's operation of the steering wheel, and outputs a signal corresponding to the detected steering angle to the vehicle data storage area 110. The gyro sensor 104 detects travel direction of the vehicle 100, and outputs a signal corresponding to the detected travel direction to the vehicle data storage area 110. The vehicle speed sensor 105 detects a rotational speed of wheels of the vehicle 100, and outputs a signal corresponding to the detected rotational speed to the vehicle data storage area 110. The acceleration sensor 106 detects an acceleration of the vehicle 100, and outputs a signal corresponding to the detected acceleration to the vehicle data storage area 110.

The vehicle 100 further has an engine ECU 107 for controlling an engine mounted on the vehicle 100, a GPS 108 for detecting an absolute position of the vehicle 100, and a car navigation system 109 having road map data therein.

The engine ECU 107 generates a fuel injection signal for determining a fuel injection amount based on a detection result of the accelerator sensor 101, and outputs the generated fuel injection signal to a fuel injection device (not shown). The engine ECU 107 outputs the generated fuel injection signal to the vehicle data storage area 110.

The GPS 108 receives a GPS satellite signal for detecting the absolute position of the vehicle, and finds a latitude and a longitude of the vehicle 100 based on the received GPS satellite signal. The GPS 108 outputs information indicating the latitude and the longitude of the vehicle 100 to the vehicle data storage area 110.

The car navigation system 109 provides the driver with guidance on a recommended route from a starting point to a destination point, and has road map data of the driving area for the vehicle 100. This road map data is information about a map, including information on road gradients, road alignments such as curves, traffic elements such as crossroads and railroad crossings, crossroad names, road names, area names, direction guide facility, and the like. There are registered, in this road map data, information relating to latitudes and longitudes and information relating to traffic elements such as continuing roads, crossroads and traffic lights, travel sections defined by the traffic elements, and travel areas including the successive traffic elements and travel sections. In other words, information relating to a travel environment of the vehicle is registered in the road map data. The car navigation system 109 refers to the road map data to output information relating to a travel environment where the vehicle 100 has passed, to the vehicle data storage area 110.

The vehicle data storage area 110 records, in time series, the detection results supplied from the sensors 101 to 106 and the GPS 108, the fuel injection signals received from the engine ECU 107, and the travel environment information received from the car navigation system 109. The vehicle data storage area 110 thus accumulates, as vehicle data of the vehicle 100, information indicating driving operations by a driver of the vehicle 100, and information relating to the travel environment in which the vehicle 100 has traveled under the driver's driving operations. In the vehicle data storage area 110, the information indicating the driver's driving operations of the vehicle 100 is associated with the information relating to the travel environment in which the vehicle 100 has traveled under the driver's driving operations.

The vehicle 100 further has an in-vehicle communication device 120 capable of wireless communication with a vehicle data analysis center 200. The in-vehicle communication device 120 transmits vehicle data accumulated in the vehicle data storage area 110 to the vehicle data analysis center 200 for example when the travel of the vehicle 100 is terminated and an accessory position of the vehicle 100 is switched from an ON state to an OFF state.

The vehicle data analysis center 200 has a center communication device 210 for receiving vehicle data transmitted from a plurality of vehicles including the vehicle 100. The center communication device 210 receives vehicle data from a plurality of vehicles including the vehicle 100 and outputs the vehicle data to a center storage device 220.

The center storage device 220 accumulates vehicle data based on a plurality of types of driving operations obtained from a plurality of vehicles through wireless communication between the center communication device 210 and the in-vehicle communication devices mounted on the plurality of vehicles.

The vehicle data analysis center 200 has a vehicle data classification unit 230. The vehicle data classification unit 230 categorizes vehicle data groups accumulated in the center storage device 220 into two groups, namely a group of "high" driving performance level and a group of "low" driving performance level, based on an evaluation criterion as an index of evaluation of driving operation levels.

The vehicle data classification unit 230 according to the present embodiment categorizes the vehicle data groups accumulated in the center storage device 220 while considering, as a unit, at least one of traffic elements such as curves and crossroads, predetermined travel sections defined by the traffic elements, and travel areas including successive traffic elements and travel sections. This means that the vehicle data classification unit 230 categorizes the vehicle data groups stored in the center storage device 220 according to driving performance levels, for example, by dividing the vehicle data groups into data units each indicating a driving operation in a common travel area. The vehicle data classification unit 230 categorizes the vehicle data groups stored in the center storage device 220 according to driving performance levels by sub-dividing the vehicle data groups into data units. Each of the data units indicates, for example, a driving operation at a certain curve that exists in the common travel area, or a driving operation in a travel section defined by successive crossroads. A travel environment including such traffic elements, travel section, and travel area is identified based on information provided by the vehicle data. The information is, for example, latitude and longitude information obtained as a detection result from the GPS 108 or information acquired from the car navigation system 109.

In the present embodiment, the evaluation criterion to be used as a basis for grouping vehicle data is set for at least one of fuel efficiency represented by travel distance per unit fuel amount of the vehicle, travel time, vehicle behavior, and lateral jerk of the vehicle.

For example, when fuel efficiency is selected as an evaluation item, the evaluation criterion for categorizing the vehicle data groups by level is set to "15 km/l", for example. Fuel efficiency of the vehicle 100 is calculated based on a fuel injection signal contained in the vehicle data of the vehicle 100. If the fuel efficiency obtained as a detection result by the engine ECU 107 is equal to or more than the evaluation criterion of "15 km/l", the vehicle data is evaluated as "high" in driving performance level. In contrast, if the fuel efficiency obtained as a detection result by the engine ECU 107 is less than the evaluation criterion of "15 km/l", the vehicle data is evaluated as "low" in driving performance level.

When a vehicle travels in a certain traffic element or a predetermined travel section within a legal speed limit, a period of time required for the vehicle to travel from entering the traffic element or the predetermined travel section to exiting the same is referred to as "passage period". When this passage period is within a predetermined travel time, the vehicle data is evaluated as "high" in driving performance level. In contrast, when the passage period exceeds the predetermined travel time, the vehicle data is evaluated as "low" in driving performance level.

A jerk, which is a variation in acceleration in a lateral direction in relation to the travel direction of the vehicle 100 can be obtained from a detection result by the acceleration sensor 106. A predetermined reference value is specified also for the jerk for evaluation of the driving performance level. Each of the vehicle data is evaluated as "high" or "low" in driving performance level based on the jerk and the reference value.

Further, a reference value is specified for evaluation of the driving performance level based on behaviors of the vehicle 100. The vehicle behaviors include occurrence of rapid acceleration or deceleration or rapid braking and occurrence frequency thereof, which can be obtained from detection results by the accelerator sensor 101 and the brake sensor 102. For example, when an occurrence frequency of rapid braking is less than a predetermined threshold, the vehicle data is evaluated as "high" in driving performance level, whereas when the occurrence frequency of rapid braking is equal to or higher than the predetermined threshold, the vehicle data is evaluated as "low" in driving performance level.

According to the present embodiment, the vehicle data groups accumulated in the center storage device 220 are categorized into two groups in total, one with "high" driving performance level and the other with "low" driving performance level, for the evaluation item of "fuel efficiency", for example, and information indicating the evaluation result is associated with each of the vehicle data.

The vehicle data classification unit 230 outputs the vehicle data groups categorized based on the evaluation criterion to a classification result storage unit 240. The classification result storage unit 240 stores the classification result by the vehicle data classification unit 230.

The classification result storage unit 240 stores the vehicle data received from the vehicle data classification unit 230 separately according to the classification result by the vehicle data classification unit 230. The classification result storage unit 240 according to the present embodiment has a first storage area 241 and a second storage area 242. For example, the first storage area 241 stores the vehicle data that has been evaluated as "high" in driving performance level by the vehicle data classification unit 230, while the second storage area 242 stores the vehicle data that has been evaluated as "low" in driving performance level by the vehicle data classification unit 230. In this case, the first storage area 241 accumulates a vehicle data group DA, which is evaluated as "high" in driving performance level by the vehicle data classification unit 230, and the second storage area 242 accumulates a vehicle data group DB, which is evaluated as "low" in driving performance level by the vehicle data classification unit 230.

The vehicle data analysis center 200 has a vehicle data analysis unit 250. The vehicle data analysis unit 250 extracts characteristic values of vehicle data differing between the vehicle data group DA and the vehicle data group DB separately stored in the classification result storage unit 240.

The vehicle data analysis unit 250 according to the present embodiment has a normalization operation unit 251. The normalization operation unit 251 normalizes the vehicle data, which are time-series data based on the travel position. The first storage area 241 stores vehicle data group DA collected from the vehicle, which has traveled in various travel areas. When normalizing the vehicle data, the normalization operation unit 251 retrieves, for example, vehicle data relating to a curve having a predetermined curvature radius from the vehicle data group DA stored in the first storage area 241. The normalization operation unit 251 retrieves, from the vehicle data group DB stored in the second storage area 242, a vehicle data group acquired under a travel environment that is common with or similar to the travel environment indicated by the retrieved vehicle data group DA. Thus, the normalization operation unit 251 retrieves a first vehicle data group (DA) and second vehicle data group (DB) from the classification result storage unit 240. The first vehicle data group indicates a driving operation that realizes a low fuel consumption (fuel saving) is realized at a certain curve existing in a certain travel route, and the second vehicle data group indicates a driving operation in which a curve with a similar shape to the above-mentioned curve constitutes a factor causing high fuel consumption.

Based on information indicating traffic elements, information indicating travel sections and information indicating travel areas contained in various vehicle data, the normalization operation unit 251 according to the present embodiment thus retrieves, from the classification result storage unit 240, vehicle data indicating driving operations that are common or similar in traffic elements, travel sections, or travel areas.

Time-series data as shown in FIG. 2(*a*) by way of example are thus retrieved from the classification result storage unit 240. The time-series data indicates the transition of operating modes of a plurality of types of operating equipment including an accelerator pedal, a brake pedal, a steering wheel and other driving elements of the vehicle 100. The transition of operating modes of the operating equipment is obtained as detection results by the sensors 101 to 106 in a certain traffic element, a certain travel section, or a certain travel area.

Figure 2A:
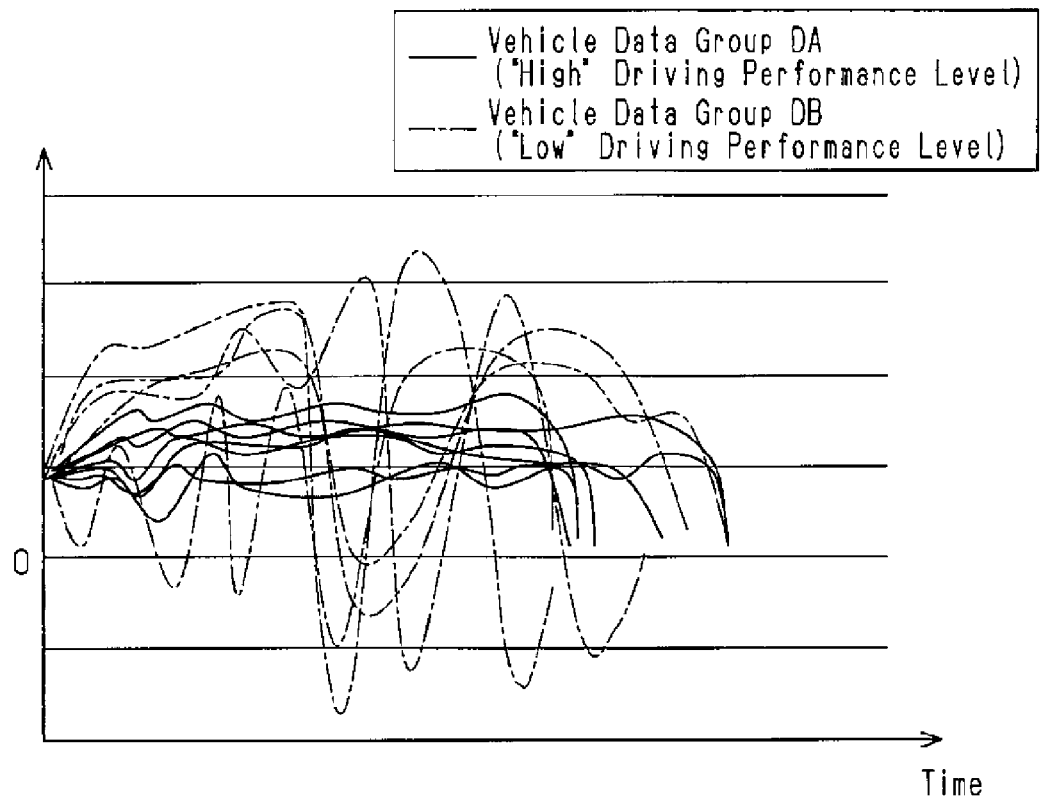
FIG. 2(a) is a graph showing an example of a vehicle data group as time-series data.

In FIG. 2(a), the vehicle data group DA evaluated as "high" in driving performance level is represented by solid lines, while the vehicle data group DB evaluated as "low" in driving performance level is represented by lines formed by a long dash alternating with a short dash. Driving operations performed by vehicles serving as supply sources of the vehicle data groups DA and DB are different from each other, and hence the vehicle data groups DA and DB have different characteristic values from each other. The characteristic values contained in the vehicle data indicate characteristics of operating modes of driving elements that are operating equipment mounted on the vehicle 100. The operating modes of the driving elements can be exemplified by accelerator-off at a predetermined timing, timing when the brake is turned on, change in depression amount of the brake pedal, and change in steering angle. In the vehicle 100 serving as the supply source of the vehicle data, variations occur in fuel efficiency, travel time in a predetermined travel section, rapid braking, and lateral jerk of the vehicle 100, according to the characteristics of the operating modes of the driving elements.

The vehicle data according to the present embodiment are detection results by the sensors 101 to 106, which are recorded in time series. As seen from FIG. 2(a), even if the vehicle data are collected from vehicles passing a common or similar traffic element, travel section, or travel area starting point, the vehicle data have different data length due to difference in travel speed or the like of the vehicles serving as the supply sources. Due to difference in travel speed or the like of the vehicles serving as the supply sources of the vehicle data, the vehicles exhibit different travel periods, which are each defined as a period of time required by a vehicle to pass through a certain traffic element, travel section, or travel area after entering the same.

Figure 2B:
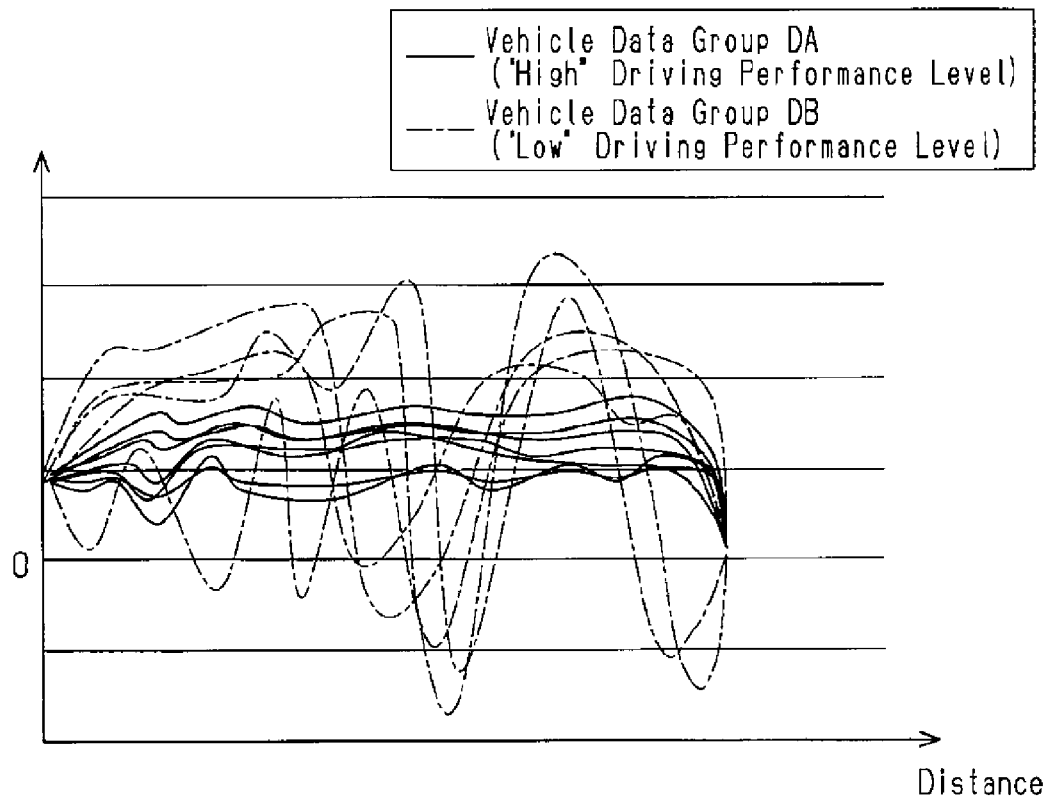
FIG. 2(b) is a graph showing an example of the vehicle data group normalized based on travel positions.

Therefore, the normalization operation unit 251 according to the present embodiment retrieves the vehicle data groups DA and DB acquired under a common or similar travel environment from the first storage area 241 and the second storage area 242, respectively. The normalization operation unit 251 then normalizes the retrieved vehicle data groups DA and DB based on the travel position. As shown in FIG. 2(b) by way of example, the data lengths of the vehicle data are thereby made the same. As shown in FIG. 1, the normalization operation unit 251 outputs the normalized vehicle data to a frequency resolution unit 252 for frequency-resolving the vehicle data.

Once the normalized vehicle data group is input to the frequency resolution unit 252 by the normalization operation unit 251, the frequency resolution unit 252 frequency-resolves the vehicle data group into a plurality of frequency bands, for example, by way of wavelet transform. For example, the frequency resolution unit 252 generates a plurality of data by resolving a single vehicle data normalized by the normalization operation unit 251 according to predetermined frequency components. The frequency resolution unit 252 performs this frequency resolution for each of the vehicle data groups normalized by the normalization operation unit 251. Thus, a massive amount of candidate data is generated as candidates for extraction to be used when a characteristic value is extracted as a factor causing a difference in driving performance levels of vehicle data. This frequency resolution also reveals a frequency component (characteristic value) locally contained in the vehicle data. Thus, the frequency resolution unit 252 outputs a candidate data group generated by means of the frequency resolution to a window function operation unit 253 for applying a window function to the candidate data group.

The window function operation unit 253 reveals the characteristic value contained in each of the candidate data groups received from the frequency resolution unit 252 by applying a window function to each of them. The window function operation unit 253 outputs the candidate data group in which the characteristic value has been revealed by application of the window function to an influence calculation unit 254. The influence calculation unit 254 obtains a degree of influence exerted by the characteristic value that has been revealed on the vehicle data evaluated using the evaluation criterion.

Once the window function operation unit 253 inputs the candidate data group in which the characteristic value is revealed by the window function operation unit 253 into the influence calculation unit 254, the influence calculation unit 254 weights the characteristic value of the vehicle data with different driving performance levels between the vehicle data group DA and the vehicle data group DB, based on a total value of differences of a common characteristic value between the data classified as data of "high" driving performance level and the data classified as data of "low" driving performance level. The difference of the common characteristic value is a difference between a characteristic value of data categorized into "high" driving performance level and a characteristic value of data categorized into "low" driving performance level under a common evaluation criterion. The influence calculation unit 254 according to the present embodiment weights the characteristic value of the vehicle data through learning with "AdaBoost" that is a known a learning algorithm. By way of this weighting, the characteristic values differing between the vehicle data group DA categorized as of "high" driving performance level and the vehicle data group DB categorized as of "low" driving performance level is extracted from the characteristic values contained in the vehicle data group DA and the vehicle data group DB.

The influence calculation unit 254 according to the present embodiment determines how the weighted characteristic value of the vehicle data relates to the travel point where the driving operation indicated by the characteristic value is performed. It is assumed that a correspondence relationship between characteristic value and travel point is defined by how the weighted characteristic value of the vehicle data relates to the travel point where the driving operation indicated by the characteristic value is performed. The correspondence relationship between characteristic value and travel point can be determined based on latitude and longitude information contained in the vehicle data or information indicating various traffic elements, travel sections and travel areas. The influence calculation unit 254 according to the present embodiment also determines how the weighted characteristic value of the vehicle data corresponds with evaluation results of the vehicle data based on the evaluation items. It is assumed that a correspondence relationship between characteristic value and evaluation result is defined by how the characteristic value of the vehicle data relates to the evaluation result of the vehicle data based on the evaluation items. The correspondence relationship between characteristic value and evaluation result can be determined from an evaluation result based on the evaluation criteria associated with the vehicle data from which the candidate data are generated.

The influence calculation unit 254 outputs a calculation result obtained by the influence calculation unit 254 to an analysis result storage unit 260 as an analysis result of the vehicle data. The analysis result storage unit 260 thus stores the characteristic value, which differ between the vehicle data group DA and the vehicle data group DB having different driving performance levels from each other, information indicating weighting of the characteristic value, information indicating the correspondence relationship between the characteristic value and the travel point, and information indicating the correspondence relationship between the amount of information and the evaluation result of the vehicle dat.

Operation of the vehicle data realized by the vehicle data analysis method and system according to the present embodiment will be described with reference to FIGS. 3 to 9.

Figure 3:
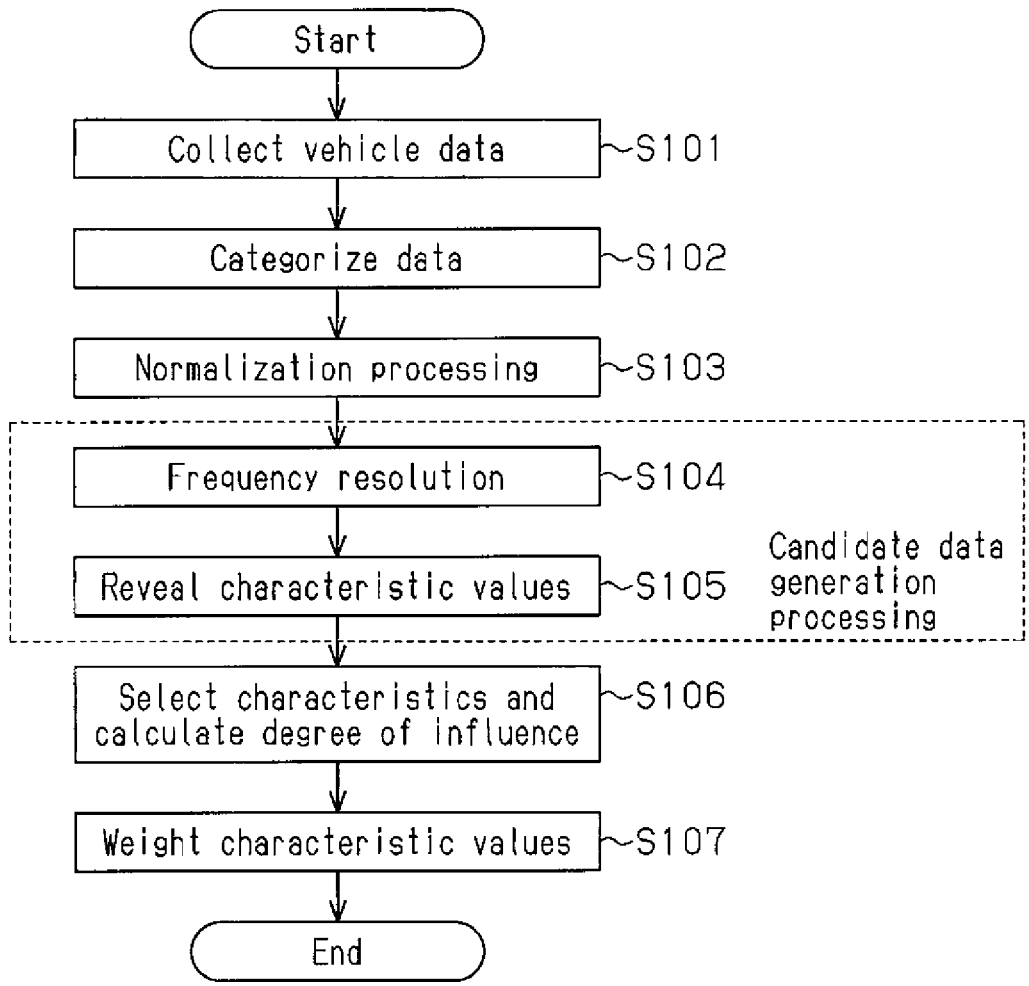
FIG. 3 is a flowchart showing an example of vehicle data analysis procedures according to an embodiment of a vehicle data analysis method.
Figure 4:
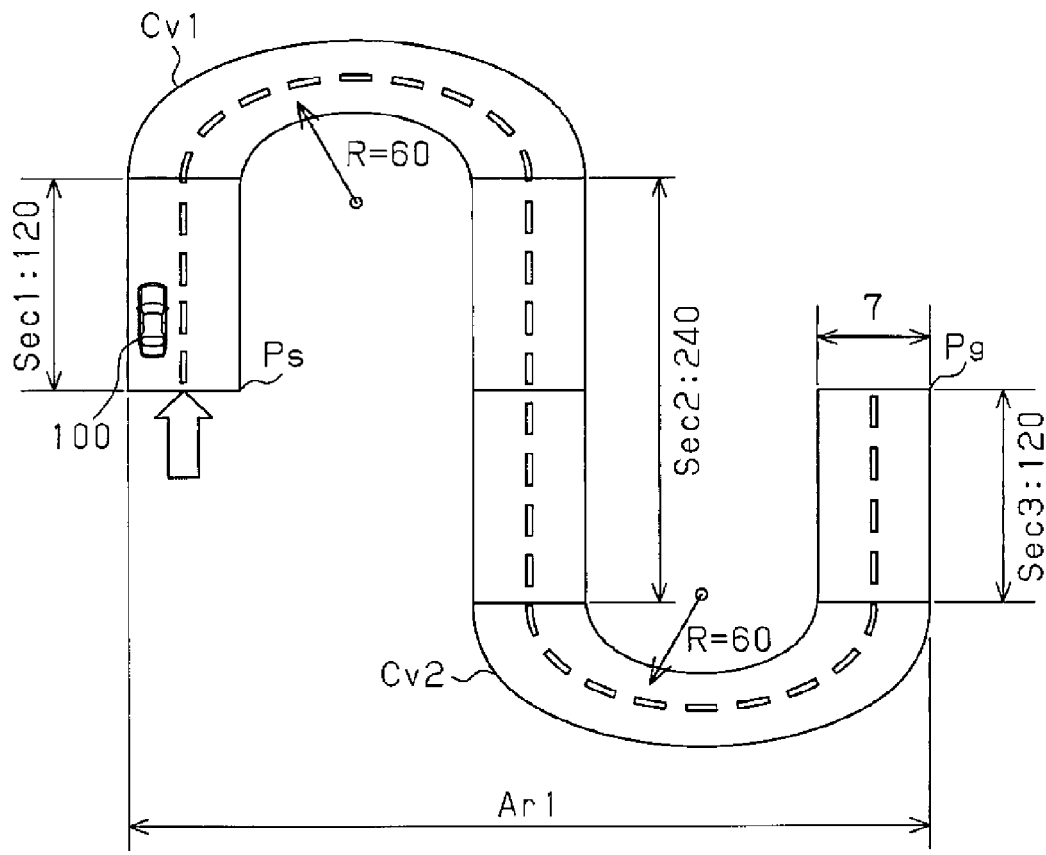
FIG. 4 is a diagram schematically showing an example of a travel area in which a vehicle used as a vehicle data providing source has traveled, together with traffic elements and travel sections contained in the travel area.

As shown in FIG. 3, firstly in step S101, vehicle data are collected from a plurality of vehicles, the vehicle data indicating driving operations performed by the vehicles and travel environments corresponding to the respective driving operations. Thus, as shown in FIG. 4, the vehicle data are collected from the plurality of vehicles that have traveled through a travel area Ar1 in which a travel section Sec1, a curve Cv1, a travel section Sec2, a curve Cv2, and a travel section Sec3 are connected in series in this order. The vehicle data indicate operating modes of various driving elements in time series. The operating modes of the driving elements include steering angles and operations of accelerator pedals or brake pedals performed by the drivers of the vehicles that have passed through the travel area Ar1.

In step S102 of FIG. 3, the collected vehicle data are categorized into a vehicle data group DA ("high" driving performance level) and a vehicle data group DB ("low" driving performance level). For example, the vehicle data group DA indicates a driving operation that contributes to high fuel efficiency for the evaluation item of "fuel efficiency", whereas the vehicle data group DB indicates a driving operation that contributes to low fuel efficiency.

Figure 5A:
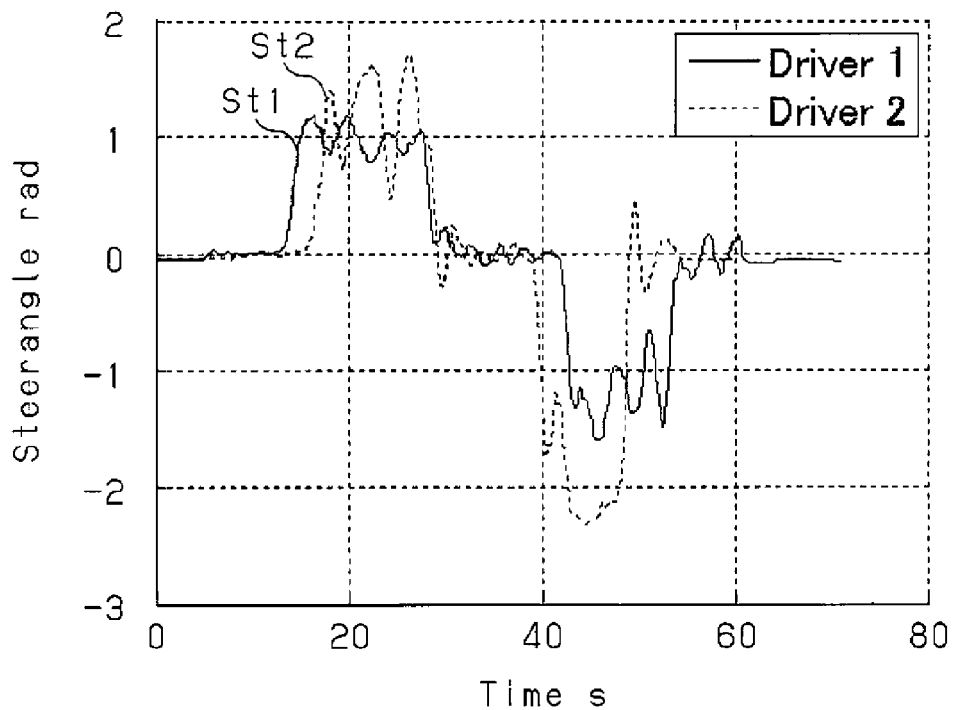
FIG. 5(a) is a graph showing an example of time-series data indicating transition of steering angle of the vehicle that has traveled in the travel area shown in FIG. 4, wherein St1 denotes time-series data that is evaluated as of "high" driving performance level, and St2 denotes time-series data that is evaluated as of "low" driving performance level.

As shown in FIG. 5(a), the time-series data indicating transition in steering angle of the vehicles, which have traveled through the travel area Ar1, are categorized into time-series data St1 and time-series data St2. In FIG. 5(a), the time-series data St1 indicated by the solid line belong to a group of "high" driving performance level, and the time-series data St2 indicated by the broken line belong to a group of "low" driving performance level.

Since these time-series data St1 and St2 are acquired under different driving operations, a characteristic value contained in the time-series data St1 and a characteristic value contained in the time-series data St2 are different from each other. These mutually different characteristic values constitute a factor causing a difference in driving performance level between the time-series data St1 and the time-series data St2.

These time-series data St1 and St2 are acquired from the vehicles, which have traveled the common travel area Ar1. However, the vehicles have traveled at different speeds. Therefore, a period of time required by the vehicle supplying the time-series data St1 to pass through the travel area Ar1 is different from a period of time required by the vehicle supplying the time-series data St2 to pass through the travel area Ar1, and hence the length of the data St1 indicated by the time axis is different from the length of the data St2.

Figure 5B:
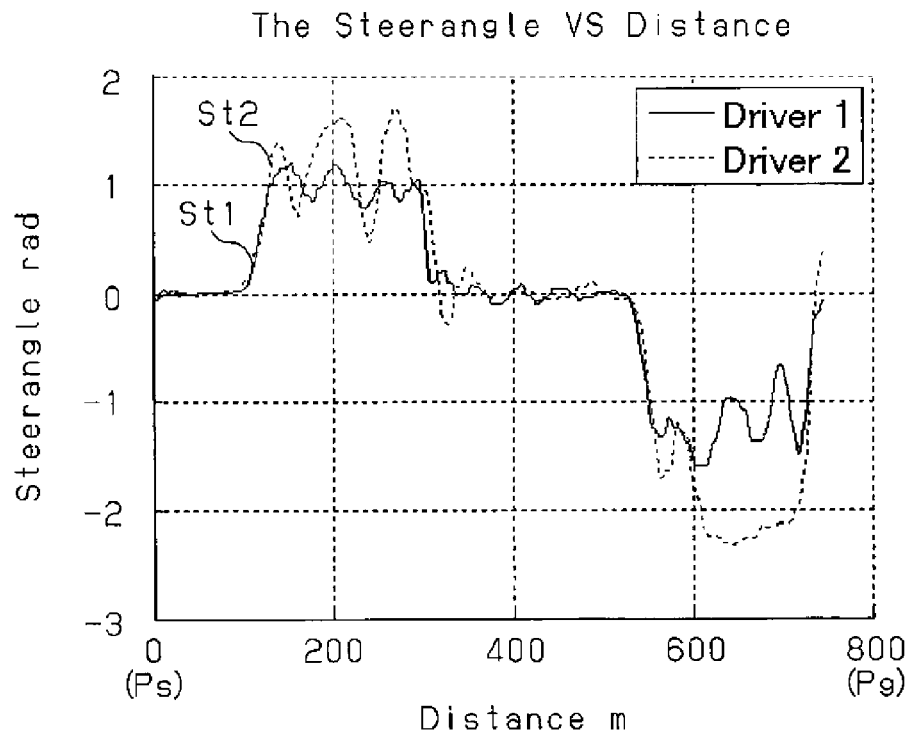
FIG. 5(b) is a graph showing normalized time-series data obtained by normalizing the time-series data shown in FIG. 5(a) based on travel positions.

Therefore, in step S103 of FIG. 3, the vehicle data groups categorized by driving performance levels are normalized based on a travel position. Thus, as shown in FIG. 5(b) by way of example, the time-series data St1 and St2 indicating the transition of steering angle in the travel area Ar1 are transformed into data formats comparable with each other by being normalized on the basis of travel positions from the starting point Ps to the end point Pg of the travel area Ar1. The normalization is thus performed on all the vehicle data categorized into the vehicle data groups DA and DB in step S102.

Figure 6A:
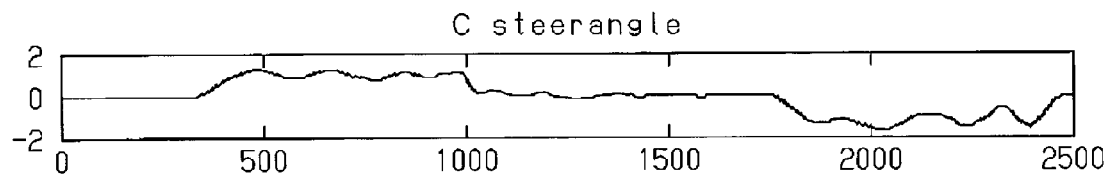
FIG. 6(a) is a graph showing an example of vehicle data resolved principally into low-frequency components.

Next, in step S104 of FIG. 3, the vehicle data contained in the normalized vehicle data groups DA and DB are frequency-resolved for example by way of wavelet transform, whereby data principally containing high-frequency components and data principally containing low-frequency components as shown in FIG. 6(a) by way of example are generated. The data principally containing low-frequency components are further resolved into data A1 and B1 to B3 containing mutually different frequency components as shown in FIGS. 6(b) to 6(e) by way of example. As seen from FIGS. 6(b) to 6(e), the data A1 and B1 to B3 containing predetermined frequency components have characteristic values indicated by the predetermined frequency components. The data that is opposite to the data principally containing low-frequency components shown in FIG. 6(a), that is, the data principally containing high-frequency components are also resolved to a plurality of pieces of data having different frequency components. Thus, when a characteristic value indicating a factor causing a difference in driving performance level is extracted, a plurality of pieces of candidate data constituting candidates to be extracted are generated from a single piece of vehicle data. The frequency resolution is performed on all the pieces of vehicle data in the normalized vehicle data groups DA and DB in step S103, whereby a large amount of candidate data are generated.

Then in step S105 of FIG. 3, processing to reveal the characteristic value contained in the generated candidate data is performed for example by way of a window function operation based on the following equation.

$$J_i = \sum_{i}^{i+15} J_i - \sum_{i+16}^{i+30} J_i \qquad \text{[Math. 1]}$$

Figure 6B:
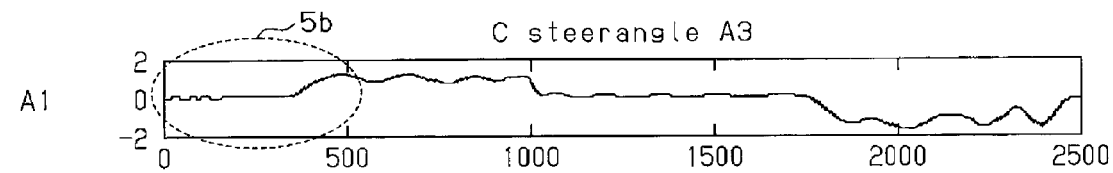
FIG. 6(b) is a graph showing an example of candidate data obtained by frequency resolution of the vehicle data shown in FIG. 6(a)
Figure 6C:
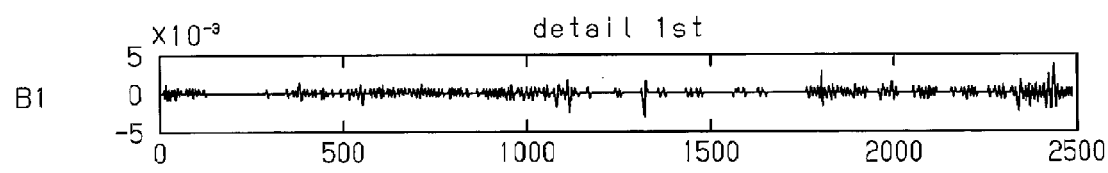
FIG. 6(c) is a graph showing an example of candidate data obtained by frequency resolution of the vehicle data shown in FIG. 6(a)
Figure 6D:
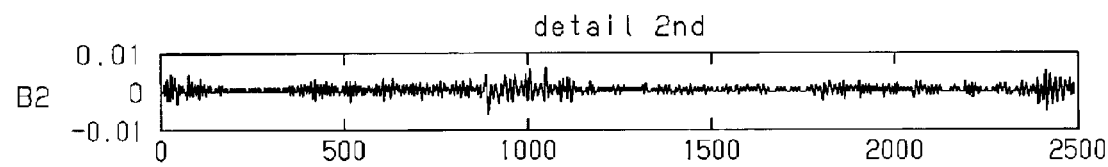
FIG. 6(d) is a graph showing an example of candidate data obtained by frequency resolution of the vehicle data shown in FIG. 6(a)
Figure 6E:
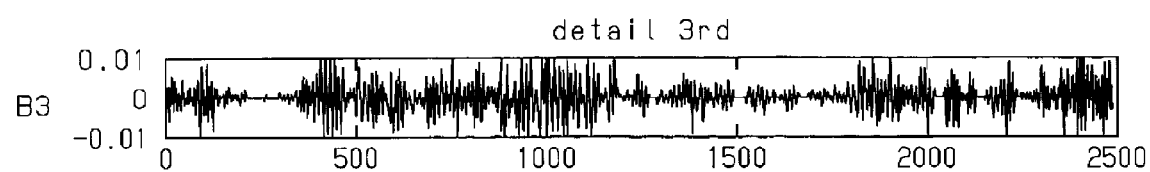
FIG. 6(e) is a graph showing an example of candidate data obtained by frequency resolution of the vehicle data shown in FIG. 6(a)
Figure 7:
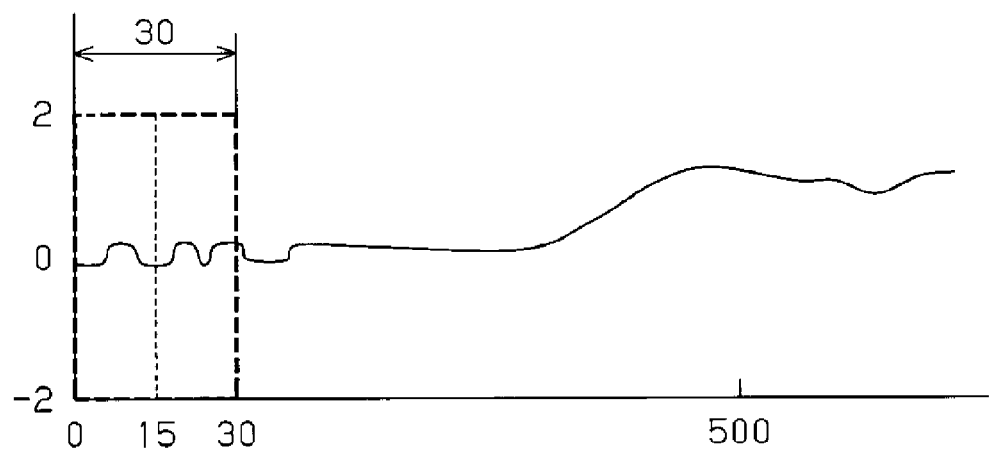
FIG. 7 illustrates an example in which a window function is applied to the frequency-resolved vehicle data.

FIG. 7 is an enlarged view of the data A1 in the region 5b of FIG. 6(b) described above. In this processing, a range from the starting point Ps (distance "0") to a predetermined travel point (distance "30") of the travel area Ar1 is selected from the data A1. The window function operation is executed on the selected range of the data. As a result of this, a difference between the data in the range from the distance "0" to "15" and the data in the range from the distance "16" to "30" of the data A1 is obtained, whereby the characteristic value contained in each range of data is revealed. The window function operation applying a window function is executed on the data in the whole range of the data A1, that is, the data corresponding to the travel area Ar1 from the starting point Ps to the terminal point Pg shown in FIG. 4, whereby all the characteristic values contained in the data A1 are revealed. Likewise, the window function operation is executed on the data B1 to B3 obtained by frequency resolution, whereby characteristic values contained in the data B1 to B3 are revealed. Thus, the characteristic values are revealed for all the vehicle data in the vehicle data groups DA and DB obtained by the frequency resolution in step S104.

In step S106 of FIG. 3, a characteristic value that differs between a candidate data group generated from the vehicle data group DA belonging to the "high" driving performance level and a candidate data group generated from the vehicle data group DB belonging to the "low" driving performance level is selected by learning using the learning algorithm. The weighting of the characteristic value is performed by calculating the influence of the characteristic value on the evaluation result based on the evaluation criteria through the above-mentioned learning (step S107).

Figure 8B:
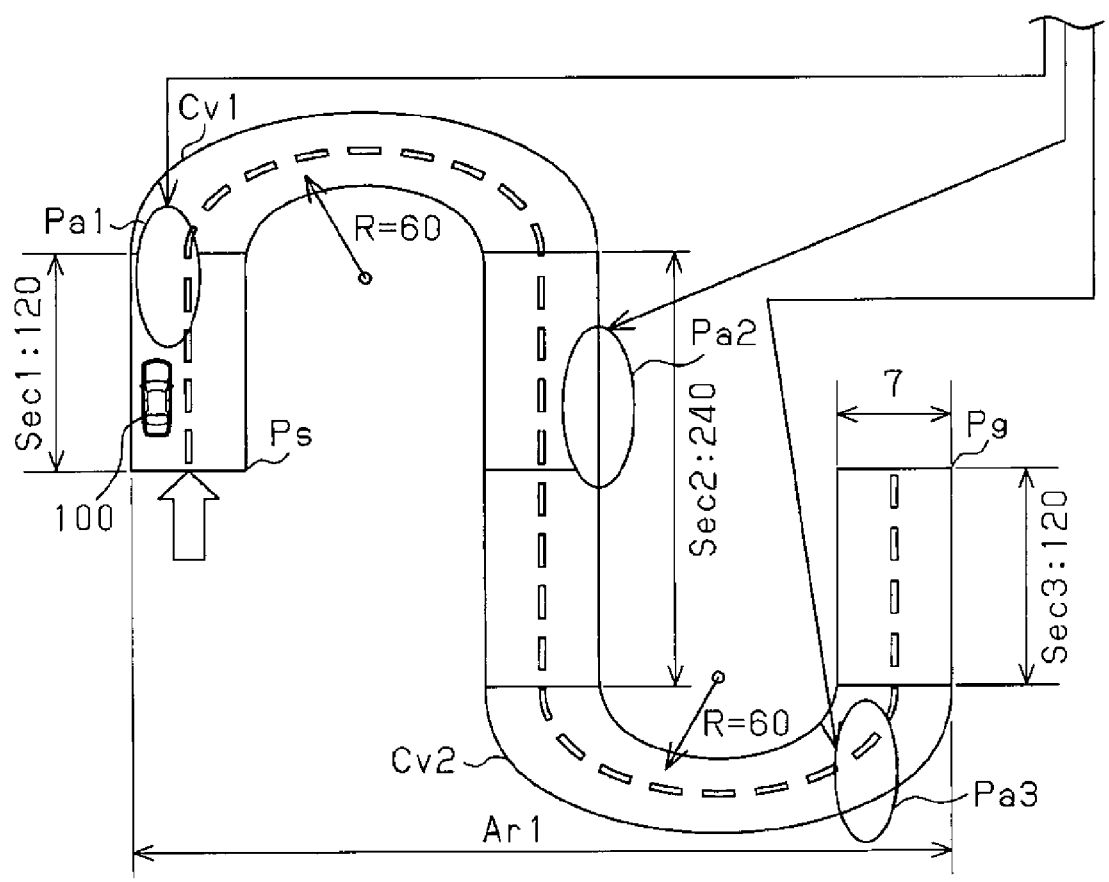
FIG. 8(b) is a diagram showing a travel model in the travel area of FIG. 4, together with the analysis result of the vehicle data group.

Thus, as shown in FIG. 8(a) by way of example, when the evaluation item is "fuel efficiency", for example, the characteristic value that exerts the greatest influence on the fuel efficiency is a characteristic value of "steering angle A1" indicating a characteristic of a steering operating mode at the travel point Pa3 in the curve Cv2 contained in the travel area Ar1, as shown in FIG. 8(b) corresponding to FIG. 4. Therefore, the characteristic value of "steering angle A1" is identified. This means that this steering angle A1 is identified as the characteristic value that exerts the most significant influence on the vehicle data evaluated based on fuel efficiency among the characteristic values contained in the generated candidate data group. The travel point Pa3 is a point located at a predetermined distance from the starting point of the curve Cv2.

A characteristic value that exerts the second greatest influence on fuel efficiency after the steering angle A1 is a characteristic value of "steering angle B3" indicating a steering operating mode at a travel point Pa2 present at a predetermined distance from the starting point of the travel section Sec2 in the travel area Ar1 shown in FIG. 8(b). Therefore, the characteristic value "steering angle B3" is identified.

A characteristic value that exerts the third greatest influence on fuel efficiency after the steering angle B3 is "accelerator B3" indicating an accelerator pedal operating mode at a travel point Pa1 extending over a travel section Sec1 and a curve Cv1 following the travel section Sec1 in the travel area Ar1 shown in FIG. 8(b). Therefore, the "accelerator B3" is identified.

Such an operation is executed for each of the travel areas Ar1 to Arn where the vehicles serving as supply sources of the vehicle data have traveled, whereby as shown in FIG. 8(a), the characteristic values that exert influence on fuel efficiency in traffic elements or travel sections present in the travel areas Ar1 to Arn are weighted. As shown in FIG. 8(a) described above, a correspondence relationship between the weighted characteristic values and the travel points is obtained.

According to the present embodiment as described above, when the vehicle data groups are categorized by driving performance levels for the evaluation item of "fuel efficiency", for example, a characteristic value indicating an operating mode of a driving element constituting a factor causing a difference in fuel efficiency between the vehicle data groups is identified for each of the travel points contained in the travel areas. At the same time, a traffic element or travel section containing each of the travel points is also identified.

Next, the frequency resolution processing by the frequency resolution unit 252 will be described in detail with reference to FIG. 9.

Figure 9:
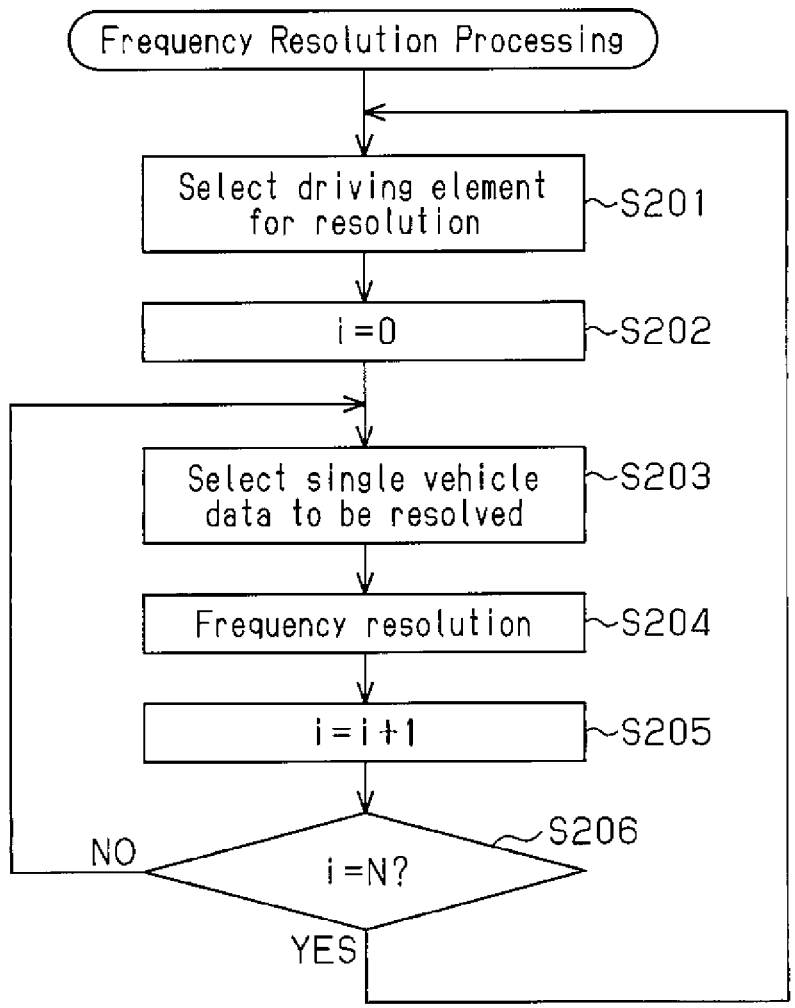
FIG. 9 is a flowchart showing an example of frequency resolution processing performed by a frequency resolution unit.

In this process, as shown in FIG. 9, one of a plurality of types of driving elements including an accelerator pedal, a brake pedal, a steering wheel and the like is selected as a driving element to be frequency resolved (step S201). Thus, a vehicle data group indicating, for example, time-series transition in depression amount of the accelerator pedal is selected from among the normalized vehicle data groups based on the various types of driving elements.

Subsequently, when an variable i is for counting N pieces of the selected vehicle data indicating the time-series transition in depression amount of the accelerator pedal, "0" is assigned to the variable i (step S202). Then, one piece of vehicle data is selected from the N pieces of vehicle data indicating time-series transition in depression amount of the accelerator pedal (step S203).

The selected one piece of vehicle data is frequency-resolved (step S204), and one is added to the variable i (step S205). Once the selected one piece of vehicle data is frequency-resolved, the other pieces of vehicle data indicating time-series transition in depression amount of the accelerator pedal that have not been frequency-resolved are sequentially frequency-resolved, and one is added to the variable i each time (NO in step S206; steps S203 to S205).

All of the N pieces of vehicle data indicating time-series transition in depression amount of the accelerator pedal have been frequency-resolved and the variable i reaches "N" (YES in step S206), a driving element other than the accelerator pedal for which frequency resolution has been completed is newly selected (step S201). The processing of sequentially frequency-resolving the data in the vehicle data group for the selected driving element is repeated until all the vehicle data groups based on all the types of driving elements stored in the center storage device 220 are frequency-resolved (steps S202 to S206).

The vehicle data analysis method and system according to the present embodiment described in the above provide advantages as follows.

(1) The analysis method and system collect a plurality of pieces of vehicle data based on a plurality of types of driving operation, and categorize the collected vehicle data into two groups according to an evaluation criterion as an index for evaluating a driving operation level. The analysis method and system then extract a characteristic value of vehicle data, which differs between the categorized groups. The analysis method and system are thus enabled to quantitatively analyze the characteristic of driving operation contained in the vehicle data.

(2) The collected vehicle data group is acquired from vehicles having traveled on an actual road under a plurality of types of driving operations by a driver. Therefore, the use of the vehicle data group makes it possible to generate travel models reflecting actual travel environments and the driving operations performed under the travel environment. In this case, a travel model incorporating a characteristic value to determine a driving performance level can be generated by generating the travel model serving as a standard based on the extracted characteristic value of the vehicle data. In other words, the analysis result of the vehicle data can be applied to generation of a travel model according to a travel environment of the vehicle, the driver's driving technique, or a driving operation pattern peculiar to the driver.

(3) The analysis method and system obtain a degree of influence exerted by the extracted characteristic value of vehicle data on vehicle data to be evaluated based on the evaluation criterion. The analysis method and system are thus not only capable of specifying a characteristic value that differs between the categorized groups of vehicle data, but also capable of specifying a degree of influence exerted by the characteristic value to the vehicle data evaluated based on an evaluation criterion, in other words, to the evaluation based on the evaluation criterion.

(4) The analysis method and system categorize vehicle data into groups and extract a characteristic value of vehicle data by regarding any one of the traffic elements, travel sections, and travel areas as units. Thus, the analysis method and system are capable of extracting a characteristic value of vehicle data reflecting a series of driving operations performed in traffic elements, travel sections, and travel areas, per each traffic element, per each travel section, and per each travel area. This enables the analysis method and system to identify a factor causing a difference in driving performance level between the vehicle data by considering the traffic elements, the travel sections, and the travel areas as units. Further, the analysis method and system are able to extract a characteristic value from a single piece of vehicle data for each traffic element, for each travel section, and for each travel area, and hence are able to extract more characteristic values from a vehicle data group collected by the vehicle data analysis center 200.

(5) The analysis method and system detect a driver's driving operations by means of the sensors 101 to 106. The analysis method and system treat, as vehicle data of the vehicle 100, these detection results and latitude and longitude information that enables identification of a travel point where the driving operation is performed by the driver and information relating to various road maps. In the embodiment shown in FIGS. 8(*a*) and 8(*b*), the analysis method and system further obtain a correspondence relationship between characteristic value of driving operation and travel point, and a correspondence relationship between characteristic value and evaluation criterion. The analysis method and system are thus capable of analyzing the vehicle data in more detail, and capable of analyzing a factor causing a difference in driving performance level based on an evaluation criterion and an influence exerted by this factor on the evaluation criterion minutely to a level of travel points.

(6) The analysis method and system normalize time-series data as the vehicle data based on a travel position. This enables the analysis method and system to transform the time-series data acquired from vehicles having different travel speeds into levels that can be compared with a high degree of precision. Thus, the analysis method and system are capable of analyzing more vehicle data (time-series data), and capable of extracting more characteristic values differing between the vehicle data.

(7) The analysis method and system use, as the characteristic values, data indicating characteristics of a plurality of driving elements indicating driving operation modes of a driver. The analysis method and system obtain a degree of influence exerted on an evaluation criterion by a plurality of types of driving elements including an accelerator pedal, a brake pedal, a steering wheel and the like, for each of the driving elements. Thus, the analysis method and system are capable of accurately identifying a plurality of factors causing a difference in driving performance level between the vehicle data even if there are a plurality of driving elements affecting fuel efficiency, vehicle behavior, and lateral jerk of the vehicle 100. The analysis method and system are capable of accurately extracting the characteristic values that are locally contained in the vehicle data, and capable of specifying a degree of influence exerted by the each of the driving elements on the evaluation criterion.

(8) The analysis method and system generate a plurality of candidate data serving as original data indicating characteristic values of the vehicle data by way of frequency resolution of the vehicle data. Therefore, the analysis method and system are capable of extracting various frequency components contained in the vehicle data, and capable of revealing various characteristic values reflecting driving operations. When extracting characteristic values differing between the grouped vehicle data, the analysis method and system are capable of generating a large amount of candidate data containing the characteristic value as candidates for those to be extracted, from a limited amount of vehicle data.

(9) Prior to extracting a characteristic value from the vehicle data, the analysis method and system reveal the characteristic value by applying a window function to the vehicle data. This enables the analysis method and system to accurately extract a minute characteristic value contained in the vehicle data, and to accurately extract the characteristic values differing between the vehicle data group DA and the vehicle data group DB obtained by grouping the vehicle data by driving performance levels.

(10) As evaluation items to be evaluated based on the evaluation criterion, the analysis method and system use fuel efficiency, which is defined by travel distance of the vehicle per unit amount of fuel, travel time, vehicle behavior, and lateral jerk of the vehicle. This enables the analysis method and system to identify a factor causing a difference between the vehicle data in fuel efficiency, travel time, smooth driving operation (rapid braking), or jerk by extracting characteristic values of the vehicle data categorized with an index of each evaluation item.

(11) The analysis method and system use grouping based on an evaluation criterion to categorize a plurality of types of vehicle data into two vehicle data groups, namely a vehicle data group DA of "high" driving performance level and a vehicle data group DB of "low driving performance level, and weight the characteristic value of the vehicle data, which differs in driving performance level between the vehicle data groups DA and DB. This enables the analysis method and system to identify factors causing a difference in driving performance level between the vehicle data groups DA and DB in the order of degree of influence to the evaluation criterion. Thus, the analysis method and system are capable of determining elements of driving operation to be improved, which are shown in the vehicle data evaluated as "low" in driving performance level, in the order of priority to improve.

The embodiment described above can be embodied in the forms as described below.

Transmission of vehicle data from the vehicle 100 to the vehicle data analysis center 200 is performed on the condition that the accessory position of the vehicle 100 has been switched from the ON state to the OFF state upon termination of driving of the vehicle 100. However, the transmission of vehicle data from the vehicle 100 to the vehicle data analysis center 200 may be performed, for example, at a timing when the accessory position of the vehicle 100 is switched from OFF state to ON state, or at a timing when the vehicle 100 passes through a predetermined traffic element or a predetermined travel section. Likewise, the transmission of vehicle data from the vehicle 100 to the vehicle data analysis center 200 may be performed at predetermined intervals. Further, the transmission of vehicle data from the vehicle 100 to the vehicle data analysis center 200 may be performed when the vehicle data analysis center 200 makes a request to that effect to the vehicle 100.

The transmission of vehicle data from the vehicle 100 to the vehicle data analysis center 200 is performed through wireless communication between the in-vehicle communication device 120 and the center communication device 210. The transmission of vehicle data from the vehicle 100 to the vehicle data analysis center 200 may be performed through wire communication or the like using an external storage medium such as a USB memory. In other words, whatever is capable of transmitting vehicle data acquired by the vehicle 100 to the vehicle data analysis center 200 can be used as a vehicle data transfer unit.

Weighting of characteristic values of the vehicle data is performed by way of learning with use of "AdaBoost" as a learning algorithm. The configuration used for the weighting is not limited to this, but may be any configuration that can perform weighting on characteristic values differing between the vehicle data group DA and vehicle data group DB, which are different from each other in driving performance level, and various other learning algorithms or operations may be used.

A degree of influence exerted by a characteristic value of vehicle data on the vehicle data to be evaluated with an evaluation criterion is determined by way of weighting of the characteristic value of vehicle data, which differs between the categorized vehicle data groups DA and DB. The degree of influence may be determined by categorizing, for example, into four levels: "high degree of influence", "medium degree of influence", "low degree of influence", and "no influence". In this case, among the characteristic values of vehicle data groups collected in a common or similar traffic element, travel section, or a travel area, those characteristic values that differ at a relatively high frequency between the data St1 and the data St2 shown in FIGS. 5(a) and 5(b), and those characteristic values that exhibit a noticeable difference between the data are determined to be of "high degree of influence". On the other hand, among the characteristic values of vehicle data groups collected in a common or similar traffic element, travel section, or a travel area, those characteristic values that differ at a relatively low frequency between the data St1 and the data St2 shown in FIG. 5, or those characteristic values that exhibit a minute difference between the data are determined to be of "low degree of influence". Further, when characteristic values are common between the grouped vehicle data groups DA and vehicle data groups DB, they are determined to be of "no influence" since they do not constitute a factor causing a difference in driving performance level between vehicle data.

The vehicle data group collected by the vehicle data analysis center 200 is categorized into two groups of "high" driving performance level and "low" driving performance level based on the evaluation criterion. Instead, the vehicle data group may be categorized into three or more groups based on the evaluation criterion. For example, when the vehicle data group is categorized into three, first to third groups in descending order of driving performance level, a characteristic value of vehicle data that differs, for example, between the first and second groups is extracted. In this case, the extracted characteristic value is identified as a factor causing a difference in driving performance level between the first group of the highest driving performance level and the second group of the second highest driving performance level. Likewise, a characteristic value of the vehicle data that differs between the second and third groups is identified as a factor causing a difference in driving performance level between the second and third groups. This makes it possible to identify a factor causing a difference in driving performance level between groups even when the driving performance level of the vehicle data can be categorized into a plurality of groups with different driving performance levels.

Weighting of a characteristic value of vehicle data that differs between the vehicle data groups DA and DB is performed, as shown in FIG. 8(a), for the evaluation item of "fuel efficiency". As shown FIGS. 10(a) and 10(b), a vehicle data group is grouped for each of the evaluation items of jerk, vehicle behavior, and travel time, and weighting may be performed on a characteristic value that differs between these grouped vehicle data. In this case, it is made possible to identify, for each travel point, a factor causing a difference in driving performance level that is evaluated not only based on fuel efficiency but also based on each of the evaluation items of jerk, vehicle behavior, and travel time.

The above-described grouping of the vehicle data groups is performed based on one of the evaluation items of fuel efficiency, travel time, vehicle behavior, and lateral jerk of the vehicle. Instead, the grouping of the vehicle data groups may be performed based on evaluation criteria for two or more evaluation items. In this case, when the evaluation items are fuel efficiency and vehicle behavior, for example, vehicle data indicating low fuel consumption and small vehicle behavior are evaluated as "high" driving performance level, whereas the other vehicle data are evaluated as "low" driving performance level. Extracting characteristic values differing between the "high" driving performance level and the "low" driving performance level makes it possible to extract a characteristic value of vehicle data indicating a driving operation that is able to simultaneously achieve evaluation criteria set for a plurality of evaluation items.

The embodiments described above employ, as the evaluation items, fuel efficiency, travel time, vehicle behavior, and lateral jerk of the vehicle. In addition to these, other evaluation items may be used for grouping the vehicle data as long as they reflect a driver's driving technique such as stability of driving operation, inter-vehicle distance and the like. When inter-vehicle distance is employed as an evaluation item, it may be set as an evaluation criterion, for example, whether or not an inter-vehicle distance between a vehicle serving as a supply source of vehicle data and another vehicle travel ahead in the travel direction of the aforementioned vehicle is maintained equal to or greater than a predetermined distance. It is also possible to set as an evaluation criterion whether or not variation in inter-vehicle distance between a vehicle serving as a supply source of vehicle data and another vehicle travel ahead in the travel direction of the aforementioned vehicle is within a certain limit.

In the embodiments described above, revealing of a characteristic value of the vehicle data is performed by way of operation using a window function. The invention is not limited to this, and any operation capable of revealing a characteristic value contained in the vehicle data may be employed for revealing the vehicle data. Any configuration may be employed as long as it can extract a characteristic value of vehicle data that differs between data groups grouped based on an evaluation criterion. The configuration in which the window function operation unit 253 is omitted does not need to perform an operation for revealing the characteristic value of the vehicle data.

In the embodiment described above, frequency resolution of vehicle data is performed by way of wavelet transform. Instead of wavelet transform, discrete cosine transform or Fourier transform, for example, may be used to perform frequency resolution of the vehicle data. In this case, a preferred transform technique is an invertible-transformable one. A configuration may be used that is able to extract frequency components of a plurality of frequency bands by resolving the frequency of the vehicle data. What is required for the configuration is to be able to extract characteristic values of the vehicle data differing between groups obtained by grouping based on an evaluation criterion. The configuration in which the frequency resolution unit 252 is omitted does not need to perform frequency resolution on the vehicle data.

The classification result storage unit 240 described above is configured to have the first storage area 241 and the second storage area 242 in which vehicle data categorized into groups according to driving performance level are stored. The configuration is not limited to this. The configuration may omit the classification result storage unit 240 and may be such that distinguishable information is assigned to each piece of vehicle data stored in the center storage device 220. The distinguishable information is information by which the vehicle data classification unit 230 is enabled to distinguish driving performance levels. In this case, the vehicle data classification unit 230 outputs to the vehicle data analysis unit 250 vehicle data groups assigned with information indicating opposite driving performance levels. The vehicle data analysis unit 250 then extracts characteristic values differing between the vehicle data having opposite driving performance levels based on the distinguishable information assigned to the vehicle data.

The characteristic values indicating characteristics of a plurality of driving elements including an accelerator pedal, a brake pedal, and a steering wheel indicating a driver's driving operation mode are extracted from vehicle data groups collected by the vehicle data analysis center 200. The invention is not limited to this and, for example, a characteristic value indicating a characteristic of one of the driving elements including an accelerator pedal, a brake pedal, and a steering wheel may be extracted from the vehicle data groups.

In the embodiments described above, vehicle data reflecting a driver's driving operation is acquired based on detection results by the accelerator sensor 101, the brake sensor 102, the steering angle sensor 103, the gyro sensor 104, the vehicle speed sensor 105, and the acceleration sensor 106. Instead of this, the vehicle data may be acquired based on a detection result by a yaw rate sensor for detecting yaw rate, which indicates a rate of change of rotation angle in turning direction of the vehicle 100. In this case, a factor causing a difference in driving performance level due to the vehicle's yaw rate is extracted as the characteristic value from the vehicle data. Further, as a vehicle data acquisition unit a configuration may be employed that is capable of acquiring a driver's driving operation mode of a signal reflecting the driving operation.

The vehicle data analysis unit 250 described above is configured to have the normalization operation unit 251. The normalization operation unit 251 normalizes time-series data as the vehicle data based on a travel position. The invention is not limited to this, and when the time-series data indicating driving operation modes in the same or similar travel environments have data lengths that are comparably close to each other, the normalization operation unit 251 may be omitted and the normalization of the time-series data as the vehicle data may be omitted.

In the embodiments above, both of the correspondence relationship between the extracted characteristic value of the vehicle data and travel point and the correspondence relationship between the characteristic value and evaluation criterion are determined. The invention is not limited to this, and only the correspondence relationship between the extracted characteristic value of the vehicle data and travel point may be determined, or only the correspondence relationship between the characteristic value and evaluation criterion may be determined.

In the embodiments above, the vehicle data having information based on which a travel point can be identified is collected from the vehicle 100. The present invention is not limited to this, and vehicle data having information based on which a traffic element, a travel section, and a travel area can be identified instead of a travel point may be collected from the vehicle 100. Then, a correspondence relationship between the traffic element, travel section, and travel area and the characteristic value of the vehicle data thus collected may be determined. Likewise, a correspondence relationship between the traffic element, travel section, and travel area thus collected and an evaluation criterion may be determined.

In the embodiments above, the weighting of characteristic values of the vehicle data is performed for each travel point contained in the travel areas Ar1 to Arn as shown in FIG. 8(*a*). However, the invention is not limited to this, and as shown in FIGS. 10(*a*) and 10(*b*) corresponding to FIG. 8(*a*), the weighting of characteristic values of the vehicle data may be performed for each of traffic elements such as curves or crossroads having common or similar road alignments or the like. Further, as shown in FIGS. 10(*a*) and 10(*b*), the weighting of characteristic values of the vehicle data may be performed for each of travel sections having common or similar road alignments or the like. In these cases, characteristic values having high degrees of influence are ranked for each of the traffic elements or each of the travel sections, whereby the characteristic values can be extracted in a more detailed manner for each of the traffic elements or each of the travel sections. In this case, vehicle data collected from vehicles travel in different travel areas can be an object to be grouped when characteristic values differing between groups are extracted, as long as the road alignments or the like of the vehicle data are similar to each other. This makes it possible to extract more characteristic values from vehicle data collected from a wider travel area.

The traffic elements, travel sections, and travel areas are treated as units, the vehicle data are grouped, and the characteristic values of the vehicle data are extracted. The invention is not limited to this, and at least one of the traffic elements, travel sections, and travel area may be treated as units, the vehicle data are grouped, and the characteristic values of the vehicle data are extracted.

In the embodiments above, the grouping based on the evaluation criterion is performed on data indicating driving operation modes in a common or similar travel environment. The invention is not limited to this, and the grouping based on the evaluation criterion may be performed, for example, only on data indicating driving operation modes in a common travel environment.

In the embodiments above, information relating to traffic elements such as curves and crossroads, travel sections, and travel areas is set as information relating to travel environments of the vehicle 100 serving as a supply source of vehicle data. Further, information indicating travel areas in which traffic congestion occurs frequently, or information indicating travel time zones in which traffic congestion occurs frequently, time zones in which a common traffic volume is observed, and weather conditions at the time when driving operations indicated by the vehicle data are performed may be set as the information relating to the travel environments of the vehicle 100. The vehicle data may be grouped and may be extracted according to a traffic congestion state or weather that can be specified based on such information. Vehicle data groups that are common in traffic element, travel section, or travel area where the driving operation indicated by the vehicle data is performed, and also common in traffic congestion state or weather in the travel area are defined as a common vehicle data group. In this case, the common vehicle data group is specified as vehicle data to be an object for grouping and extraction of characteristic values. In this case, the grouping and extraction of characteristic values are performed on the common vehicle data groups based on an evaluation criterion. Thus, a difference in characteristic value between the vehicle data caused by a difference in travel environment can be accurately distinguished from a difference in characteristic value between the vehicle data caused by a difference in drivers' driving technique. This makes it possible to extract a factor from the vehicle data group more accurately, the factor causing a difference in characteristic value caused only by the driver's driving technique, in other words, a factor causing a difference in driving performance level between the vehicle data although the driving operations are performed in the same travel environment.

In the embodiments above, information indicating a travel environment of the vehicle 100 from which vehicle data are collected is contained in the vehicle data. The invention is not limited to this. When vehicle data collected under a common or similar travel environment may be identified based on transition of vehicle data for extracting characteristic values, the GPS 108 or the car navigation system 109 may be omitted, and only the data indicating transition of the driver's driving operation may be collected as the vehicle data.

In the embodiments above, a degree of influence exerted by the extracted characteristic value of vehicle data on the vehicle data evaluated based on the evaluation criterion is determined. The invention is not limited to this, and only characteristic values differing between groups that have been grouped based on the evaluation criterion may be extracted from the vehicle data groups. In this case as well, a factor causing a difference in driving performance level between the groups can be quantitatively specified according to the extracted characteristic values of the vehicle data.

In the embodiments above, the characteristic values of vehicle data are extracted from vehicle data groups collected from a large indefinite number of vehicles without specifying types of vehicles. The invention is not limited to this, and only a vehicle data group collected from the same type of vehicles may be used for the analysis when a difference in characteristic value of vehicle data caused only by driver's driving operation is extracted from the vehicle data group. In this case, individual variability among vehicles is removed, characteristic values attributable only to a difference in driver's driving technique may be accurately extracted. This enables more accurate analysis.

In the embodiments above, the vehicle data are acquired from a plurality of vehicles. The invention is not limited to this, and the vehicle data to be analyzed may be acquired from a single vehicle. The vehicle data to be analyzed may be acquired based on the same driver's driving operations if the vehicle data are different in driving operation. In other words, any vehicle data that can be grouped based on the evaluation criterion and reflect a plurality of types of driving operations may be used as an object of the analysis.

The invention claimed is:

1. A vehicle data analysis method for analyzing vehicle data reflecting a driver's driving operation, comprising:
   collecting a plurality of pieces of vehicle data based on a plurality of types of driving operations;
   grouping these collected pieces of the vehicle data into at least two groups based on an evaluation criterion that is an index for evaluating a level of the driving operation;
   extracting characteristic values of vehicle data differing between the groups; and
   obtaining a degree of influence exerted by the extracted characteristic value of vehicle data on the vehicle data evaluated based on the evaluation criterion.

2. The vehicle data analysis method according to claim 1, wherein
   the vehicle data includes information indicating at least one of a traffic element, a travel section, and a travel area where the traffic element and travel section are connected in series, and
   the grouping of the vehicle data and the extraction of the characteristic values of the vehicle data are performed by treating the traffic element or the travel section or the travel area as a unit.

3. The vehicle data analysis method according to claim 1, wherein the vehicle data includes information indicating a travel point, and the vehicle data analysis method further comprises:
   obtaining a correspondence relationship between the extracted characteristic values of the vehicle data and the travel point, and a correspondence relationship between the extracted characteristic values of the vehicle data and an evaluation result of the vehicle data based on the evaluation criterion.

4. The vehicle data analysis method according to claim 1, wherein extracting the characteristic values of the vehicle data further comprises:
   normalizing time-series data as the vehicle data based on a travel position.

5. The vehicle data analysis method according to claim 1, wherein
   the characteristic values indicate characteristics of one or more driving elements representing a driver's driving operation mode, and
   the analysis method further comprises obtaining a degree of influence exerted by the driving element on the evaluation criterion for each of the driving elements.

6. The vehicle data analysis method according to claim 1, further comprising:
   generating a plurality of candidate data as original data for indicating the characteristic values of the vehicle data by way of frequency resolution of the vehicle data.

7. The vehicle data analysis method according to claim 1, further comprising:
   revealing the characteristic values by applying a window function to the vehicle data prior to the extraction of the characteristic values of vehicle data.

8. The vehicle data analysis method according to claim 1, wherein the evaluation criterion is a criterion for grouping that is performed for at least one of evaluation items consisting of fuel efficiency defined by travel distance of a vehicle per unit fuel amount, travel time, vehicle behavior, and lateral jerk of a vehicle.

9. The vehicle data analysis method according to claim 1, wherein
   the grouping comprises categorizing the plurality of types of vehicle data into a vehicle data group of "high" driving performance level and a vehicle data group of "low" driving performance level by way of the grouping based on the evaluation criterion,
   the extraction of the characteristic values of the vehicle data comprises performing weighting on characteristic values of vehicle data differing in the driving performance level based on a total value of differences of characteristic values which are common between the data group of "high" driving performance level and the vehicle data group of "low" driving performance level, which are grouped based on the evaluation criterion, and
   the difference of the common characteristic values is a difference between the characteristic value of the data categorized by the group of "high" driving performance level and the characteristic value of the data categorized by the group of "low" driving performance level.

10. A vehicle data analysis system for analyzing vehicle data reflecting a driver's driving operation, comprising:
   a storage device configured to store vehicle data based on a plurality of types of driving operations;
   a vehicle data classification unit configured to group the vehicle data stored in the storage device into at least two groups based on an evaluation criterion that is an index for evaluating a level of driving operation; and
   a vehicle data analysis unit configured to extract characteristic values of vehicle data differing between the groups grouped by the vehicle data classification unit, wherein the vehicle data analysis unit further comprises an influence calculation unit configured to obtain a degree of influence exerted by the extracted characteristic value on the vehicle data evaluated based on the evaluation criterion.

11. The vehicle data analysis system according to claim 10, wherein
the vehicle data includes information indicating a traffic element, a travel section, and a travel area where the traffic element and travel section are connected in series,
the vehicle data classification unit and the vehicle data analysis unit are configured to perform grouping of the vehicle data and extraction of the characteristic values of the vehicle data by treating the traffic element or the travel section or the travel area as a unit.

12. The vehicle data analysis system according to claim 10, wherein
the vehicle data includes information indicating a travel point; and
the vehicle data analysis unit is configured to obtain a correspondence relationship between the extracted characteristic values of the vehicle data and the travel point, and a correspondence relationship between the extracted characteristic values of the vehicle data and an evaluation result of the vehicle data based on the evaluation criterion.

13. The vehicle data analysis system according to claim 10, wherein the vehicle data analysis unit further comprises a normalization operation unit configured to normalize time-series data as the vehicle data based on a travel position.

14. The vehicle data analysis system according to claim 10, wherein
the characteristic values are characteristics of one or more driving elements indicating a driver's driving operation mode, and
the vehicle data analysis unit is configured to determine a degree of influence exerted by the driving element on the evaluation criterion for each of the driving elements.

* * * * *